US011022088B2

(12) United States Patent
Schurtenberger

(10) Patent No.: US 11,022,088 B2
(45) Date of Patent: Jun. 1, 2021

(54) ACCELERATED AND-OR REDIRECTED FLOW-INDUCING AND-OR LOW PRESSURE FIELD OR AREA-INDUCING ARRANGEMENT, THEIR USE WITH TURBINE-LIKE DEVICES AND METHOD FOR USING SAME

(71) Applicant: Walter Schurtenberger, Key West, FL (US)

(72) Inventor: Walter Schurtenberger, Key West, FL (US)

(73) Assignee: HYDROKINETIC ENERGY CORP, Key West, FL (US)

( * ) Notice: Subject to any disclaimer, the term of this patent is extended or adjusted under 35 U.S.C. 154(b) by 45 days.

(21) Appl. No.: 16/186,400

(22) Filed: Nov. 9, 2018

(65) Prior Publication Data

US 2019/0153992 A1 May 23, 2019

Related U.S. Application Data

(63) Continuation-in-part of application No. 15/697,401, filed on Sep. 6, 2017, now Pat. No. 10,294,913, which (Continued)

(51) Int. Cl.

*F03B 11/02* (2006.01)
*F03B 3/12* (2006.01)
*F03B 15/04* (2006.01)

(Continued)

(52) U.S. Cl.

CPC .............. *F03B 11/025* (2013.01); *F03B 3/04* (2013.01); *F03B 3/126* (2013.01); *F03B 11/08* (2013.01); *F03B 13/264* (2013.01); *F03B 15/04* (2013.01); *F03B 17/061* (2013.01); *F05B 2210/16* (2013.01); *F05B 2220/7066* (2013.01); *F05B 2240/122* (2013.01); *F05B 2240/124* (2013.01); *F05B 2240/133* (2013.01);

(Continued)

(58) Field of Classification Search

CPC .. F03B 11/025; F03B 11/08; F05B 2240/122; F05B 2240/132; F05B 2240/133

See application file for complete search history.

(56) References Cited

U.S. PATENT DOCUMENTS 5,411,224 A * 5/1995 Dearman ............... B64D 33/02 244/53 B
6,872,232 B1 * 3/2005 Pavlatos ............... B01D 45/12 55/306

(Continued)

*Primary Examiner* — David Hamaoui
*Assistant Examiner* — Brian O Peters

(57) ABSTRACT

An accelerated and/or redirected flow arrangement, optimally serving as a wildlife and/or debris excluder (WDE), is used in combination with a turbine-like device having an inlet end and an outlet end for fluid flowing therethrough, e.g., a hydro-turbine. The arrangement includes at least a forward part designed to be placed in front of a fluid inlet of a turbine-like device and configured to produce at least one of the following effects on the fluid: (a) imparting a re-direction of the fluid; and/or (b) accelerating the flow velocity of the fluid, as it flows through the forward part. Turbine-like devices having both a forward part and a rearward part of flow arrangement are disclosed, as well as a method of enhancing turbine performance.

30 Claims, 20 Drawing Sheets

Related U.S. Application Data is a continuation of application No. PCT/US2016/017857, filed on Feb. 12, 2016.

(60) Provisional application No. 62/584,098, filed on Nov. 9, 2017, provisional application No. 62/115,540, filed on Feb. 12, 2015.

(51) Int. Cl.

| | |
|---|---|
| ***F03B 17/06*** | (2006.01) |
| ***F03B 13/26*** | (2006.01) |
| ***F03B 11/08*** | (2006.01) |
| ***F03B 3/04*** | (2006.01) |

(52) U.S. Cl.

CPC ....... *F05B 2240/14* (2013.01); *F05B 2240/30* (2013.01); *F05D 2210/11* (2013.01); *F05D 2220/30* (2013.01)

(56) References Cited

U.S. PATENT DOCUMENTS

| | | | | |
|---|---|---|---|---|
| 7,471,009 | B2 * | 12/2008 | Davis | F03B 13/083 290/54 |
| 8,657,895 | B2 * | 2/2014 | Kline | F02C 7/055 55/306 |
| 8,764,391 | B2 * | 7/2014 | Smith | F03B 13/264 415/191 |
| 8,851,828 | B2 * | 10/2014 | Zhang | F03D 1/0608 415/4.1 |
| 9,000,604 | B2 * | 4/2015 | Sireli | F03B 11/02 290/54 |
| 9,234,461 | B2 * | 1/2016 | Snyder | F02C 7/055 |
| 10,030,520 | B2 * | 7/2018 | Duchene | F03B 3/126 |
| 2018/0017036 | A1 * | 1/2018 | Steiner | F03D 1/04 |

* cited by examiner

ACCELERATED AND-OR REDIRECTED FLOW-INDUCING AND-OR LOW PRESSURE FIELD OR AREA-INDUCING ARRANGEMENT, THEIR USE WITH TURBINE-LIKE DEVICES AND METHOD FOR USING SAME

BACKGROUND OF THE INVENTION

This application relates to an arrangement for providing an accelerated and/or redirected flow, preferably a vorticized or rotating flow on the inlet side and/or inducing and/or increasing a low-pressure field on the output side of a fluid-driven rotary power-generating device, e.g., a turbine, a hydrokinetic generator, a wind generator or other device that uses a rotor blade or impeller structure to translate the force of moving fluid into radial or rotary power (such devices hereinafter referred to for ease as "turbine-like devices"). The reason for associating the accelerated and/or redirected flow-inducing/low pressure field-inducing arrangement with a turbine-like device is to increase the efficiency or energy output of the device. The application also relates to a method and apparatus for enhancing the performance of a turbine-like device utilizing the accelerated and/or redirected flow-inducing arrangement and/or the low-pressure field-inducing arrangement according to the application.

It is known for turbine-like devices to be provided with a Wildlife and Debris Excluder (WDE); however, these WDE's are not commonly employed for most turbine-like devices, especially hydro-turbines, due to added expense and perhaps more importantly, due to the anticipated lowering of power-generating performance, since any type of WDE represents a flow-restricting/limiting obstacle at the inlet and/or outlet of the turbine-like device and has a certain blockage effect on the water flow. In the preferred embodiments of the present disclosure, the accelerated and/or redirected flow-inducing/low pressure field-inducing arrangement of the invention can also serve the function of a WDE. The accelerated and/or redirected flow-inducing/ low pressure field-inducing arrangement, which can be advantageously employed as a WDE is preferably comprised of two parts, which are preferably used together but may also advantageously be used individually.

One part is designed to be placed in front of the intake of any turbine-like device, and the other part is designed to be placed behind the exit of any type of turbine-like device. The first part that is placed in front of the intake of a turbine-like device will be referred to as an "accelerated and/or redirected flow-inducing arrangement", preferably in the form of a WDE. The second part will be referred to as a "low pressure field-inducing arrangement", preferably in the form of a WDE.

The arrangements of the invention can be employed with an turbine-like device, and are most advantageously employed in combination with hydrokinetic energy producing devices of the type described in published patent application WO 2016/130984 A2, the entire disclosure of which is hereby incorporated by reference into the present application document. Most preferably, the arrangements of the invention also serve as WDE's for these hydrokinetic energy producing devices. The present accelerated and/or redirected flow-inducing/low pressure field-inducing arrangements can advantageously be retro-fitted to existing turbine-like devices.

Both arrangements, the accelerated and/or redirected flow-inducing arrangement, preferably a vortex- or rotation-inducing arrangement, and the low-pressure field-inducing arrangement, are suitable for operation in any type of moving fluid for generating vorticized or rotational flow in front of the intake of any turbine-like device or any device with a central rotor or impeller and/or for generating a low-pressure field behind the exit of any turbine-like device or any device with a central rotor or impeller. They are applicable to or can be used in any kind of fluid that flows with a minimum ambient flow velocity of at least about 0.25 m/s and flows through the turbine-like section. Preferably, the fluid is water.

The turbine-like devices with the associated accelerated and/or redirected-flow-inducing and/or low-pressure field-inducing arrangements of the invention may be placed underwater to introduce an accelerated and/or redirected flow, preferably a vorticized/rotational flow and/or a low-pressure field/area into a stream or current of water, or they may be placed into the air to induce an accelerated and/or redirected flow, preferably vorticized flow and/or low pressure into an air flow or current of moving air or wind. These turbine-like devices may also be mounted on a vessel or a vehicle, fixed mounted or tethered, floating or submersed, land-based or airborne. They may be installed on a fixed device or tethered to a device that is placed in a naturally occurring/existing moving fluid, fluid current or stream, or it may be towed or pushed through the fluid, or it may be installed on another device or method to artificially create a flow of the fluid through the turbine-like device. Most preferably, the arrangements according to the invention can advantageously be used in connection with hydrokinetic energy devices utilized for producing energy from moving water, especially in rivers, dammed-up bodies of water, ocean currents and/or tidal currents.

SUMMARY OF INVENTION

According to one aspect of the present invention, there is provided an accelerated and/or redirected flow arrangement intended for use in combination with a "turbine-like device" having an inlet end and an outlet end for fluid flowing therethrough. The accelerated and/or redirected flow arrangement is comprised of at least one of two parts, selected from (a) a forward part designed to be placed in front of the intake of a turbine-like device comprising an accelerated and/or redirected flow-inducing arrangement; and (b) a rear part that is designed to be placed at the exit of a turbine-like device comprising a low pressure field-inducing arrangement. In the case of the forward part, it preferably comprises a deflector structure configured so as to produce at least one of the following effects on the fluid flowing through the turbine-like device: (a) imparting a re-direction of the fluid as it passes through the forward part, preferably produce at least some vorticized or rotating flow on the inlet side; and/or (b) accelerating the flow velocity of the fluid as it flows through the forward part. In the case of the rearward part, it is preferably configured so as to induce a low-pressure or reduced-pressure field or area on the output side of the turbine-like device, preferably by creating an accelerated and/or re-directed flow through the rearward part. It is advantageous to employ both parts in combination with a turbine-like device.

Preferably, the deflector structure of the forward part comprises an array of deflector rods that are configured to provide at least one of the effects (a) and/or (b), and more preferably, the deflector structure comprises a conically-shaped structure, adapted to be placed at or near the forward, fluid inlet end of the turbine-like device, wherein the conically-shaped array of deflector rods comprises a plurality of arrays oriented to produce a re-direction of the fluid that comprises at least some rotational re-direction.

According to another aspect of the present invention, there is provided a combination of at least the forward part of the one or more flow arrangements, as described above, with a turbine-like device, preferably a hydrokinetic turbine device, and most preferably a uni-directional hydrokinetic turbine device. Preferably, the turbine-like device includes a generally cylindrical accelerator shroud section that defines within its cylindrical cross-section a fluid flow area and a rotor assembly that is (a) mounted for rotation within the accelerator shroud around an axis that is generally parallel to the direction of fluid flow through the turbine-like device, and (b) includes a plurality of rotor blades extending radially outwardly from the center of the turbine-like device. Most preferably, the rotor assembly comprises a center hub and a plurality of blade members mounted on the hub member, wherein the force-generating member is mounted for rotation on the inner surface of the accelerator shroud, and the center hub has an open center defined by a wall member that has a hydrofoil-shaped cross-section.

In one preferred aspect, the forward part of the flow arrangement in the combination comprises an array of deflector rods that are configured to provide at least one of the effects (a) and/or (b), and more preferably, the deflector structure comprises a conically-shaped structure, adapted to be placed at or near the forward, fluid inlet end of the turbine-like device, wherein the conically-shaped array of deflector rods comprises a plurality of arrays oriented to produce a re-direction of the fluid that comprises at least some rotational re-direction of the fluid with respect to the fluid flow direction through the turbine.

Preferably, the combination further comprises a rearward part of the deflector structure comprising a rear array of deflector rods that is adapted to be placed at or near the rear, exit end of the turbine-like device, and the rear array is configured to produce a decrease in pressure at the outlet end of the turbine-like device, preferably a radial redirection of the fluid with respect to the direction of fluid flow through the turbine-like device.

Most preferably, at least one of the forward and rearward deflector arrays includes deflector rods having a cross-sectional shape that produces an acceleration of the fluid flow through them, preferably a hydrofoil/airfoil cross-sectional shape. In one embodiment, the rear array of deflector rods comprises a pattern of concentric ring-like deflector rods.

According to another aspect of the invention, there is provided a wildlife and/or debris deflector member adapted for use in a turbine-like device having an inlet end and an outlet end for fluid flowing therethrough, preferably a hydrokinetic turbine. The deflector member comprises: a shaped structure, which comprises an array of deflector rods that are configured to provide at least one, preferably both, of the following effects on the fluid flowing through the turbine-like device: (a) imparting a re-direction of the fluid as it passes through the deflector member array; and/or (b) accelerating the flow velocity of the fluid as it flows through the deflector member array. In one preferred embodiment, the deflector member is preferably a conically-shaped structure, adapted to be placed at or near the forward, fluid inlet end of the turbine-like device, and the re-direction of the fluid preferably comprises at least some rotational re-direction. In another embodiment, the deflector member is adapted to be placed at or near the rear, exit end of the turbine-like device, and the redirection of the fluid preferably comprises a radial re-direction with respect to the direction of fluid flow through the turbine-like device. It is most preferred to use both the forward and rear deflector members in combination with a turbine-like device, preferably a hydrokinetic turbine device. Most preferred in both the forward and rear deflector arrays is to provide for an acceleration of the fluid flow through them, preferably by providing at least some of the deflector rods with a cross-sectional shape that produces a flow velocity increasing effect, most preferably a hydrofoil/airfoil cross-sectional shape.

In one preferred embodiment, the spacing of the deflector rods in the conically-shaped array is equal, thereby defining the minimum sized of object that can pass through the wildlife and/or debris deflector member.

In accordance with still another aspect of the present invention, there is provided a method for enhancing the performance of a turbine-like device, comprising: operating a turbine-like device having a fluid inlet end and a fluid exit end defining a direction of fluid flow through the device, which device includes a generally cylindrical accelerator shroud section that defines within its cylindrical cross-section a fluid flow area and a rotor assembly that is (a) mounted for rotation within the accelerator shroud around an axis that is generally parallel to the direction of fluid flow through the turbine-like device, and (b) includes a plurality of rotor blades extending radially outwardly from the center of the turbine-like device, by allowing a fluid to flow through the device; and allowing the flowing fluid to pass through at least one of the following devices: (a) a forward deflector structure designed to be placed in front of the fluid inlet end of the device an comprising an arrangement that creates at least one of an accelerated flow- and/or redirected flow-inducing effect; and (b) a rear deflector structure designed to be placed at or near the fluid exit end of the device, comprising an arrangement that induces a low or reduced pressure field beyond the exit end of the device. Preferably, the forward deflector structure is configured to produce a vorticized or rotating flow on the inlet side of the device, and the rear deflector member is configured to induce a low-pressure or reduced-pressure field or area on the exit side of the device, by creating at least one of an accelerated and/or re-directed flow through the rear member.

In on preferred embodiment, the forward deflector structure comprises a conically-shaped structure, adapted to be placed at or near the forward, fluid inlet end of the turbine-like device, wherein the conically-shaped array of deflector rods comprises a plurality of arrays oriented to produce a re-direction of the fluid that comprises at least some rotational re-direction. It is advantageous to provide that the vorticized or rotating flow produced on the inlet side of the device has a direction of rotation opposite to the rotation direction of the rotor blades.

Further objects, features and advantages of the present invention will be apparent to those skilled in the art from the detailed description of preferred embodiments set forth above, when considered together with the accompanying figures of drawing.

DETAILED DESCRIPTION OF PREFERRED EMBODIMENTS OF THE INVENTION

Figure 1:
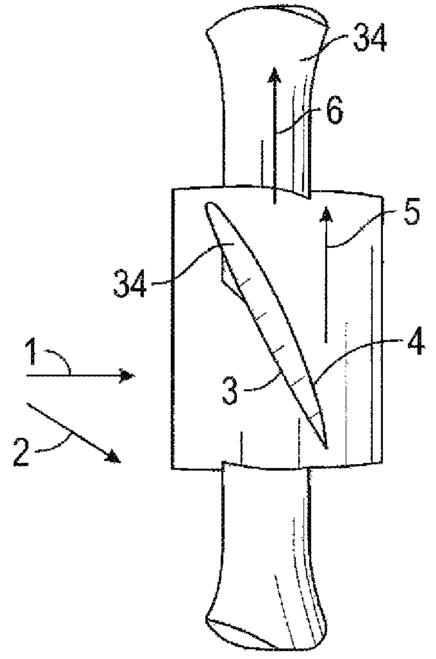
FIG. 1 is a side view of a turbine blade/rotor section of a turbine-like device showing various numbered performance parameters.

According to one preferred embodiment of the invention, the first or forward arrangement (10) for creating an accelerated and/or redirected flow (FIGS. 3, 4, 5, 6, 7, 8 and 17) has a unique way of creating a vorticized/rotational flow in the fluid prior to the fluid entering or being aspirated or pushed into the entrance of a nozzle or intake 22 of a turbine-like device (8) to create a directional change and/or a directional acceleration of the fluid. The change in direction/rotation can be in either direction or sense, clockwise or counterclockwise, i.e., meaning that it can be either in the same direction as the rotating blade member(s) 34 of the turbine-like device (8) or in the opposite direction. The preferred direction of rotation is opposite to the direction of the rotating blades; however, beneficial effects are achieved also in the case of rotation in the same direction of the blades.

Use of one or both of the forward (10) and rear (18) arrangements of the invention allows the receiving turbine-like device to at least operate at a not-impaired efficiency level, but preferably at a higher efficiency level, than it would do without the use of any accelerated and/or redirected flow-inducing and/or low-pressure field-inducing arrangement, such as a WDE. When using the forward arrangement (10) also as a WDE device, the unique way of creating vorticized/rotational flow in the fluid prior to entering a turbine-like device (8) to create change of direction or acceleration (most preferably directional acceleration) of the fluid, allows the receiving device to operate at a higher efficiency level than it would do with other WDE devices, i.e., to eliminate any negative effects of using a WDE, which are normally caused by the blockage effect or turbulence created by other WDEs.

The preferred front arrangement (10) of the invention will also make a turbine-like device produce a higher power/energy output or operate more efficiently than the same turbine would achieve without the vortex/rotational flow inducing device. It can also mean that a turbine-device fitted with the front arrangement may be as efficient in a lower velocity environment as other turbines are in a higher velocity environment.

Figure 2:
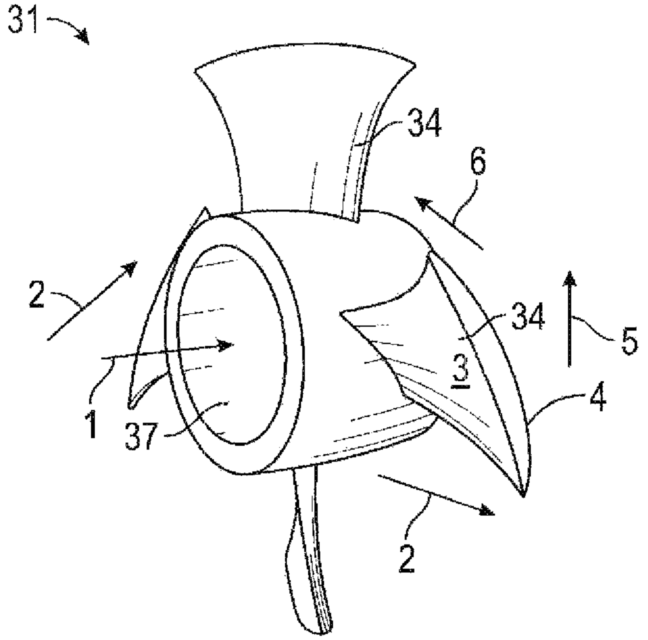
FIG. 2 is a perspective view of a turbine rotor showing various numbered performance parameters.

The vorticized/rotational flow of the fluid created by the preferred front arrangement (10) results in the rotational flow direction to be preferably in the opposite direction of the rotation of the rotor blades 34 inside the turbine, since this has been found to maximize the increase in efficiency (FIGS. 1, 2). The normal axial direction of flow without WDE is shown as (1). The force vector of the fluid current, which is normally essentially in the axial direction of the turbine without a WDE, has now been changed by the WDE to have a certain amount of a redirected, rotational directional component (2), preferably in the opposite direction of the rotation of the blades of the rotor or impeller of the turbine-like device, This vorticized/rotational flow-inducing arrangement increases the load of the fluid on the surface of the blades of the rotors or impellers of the turbine-like device (8). Increasing the load on the rotor blades has the effect to increase the pressure on the blades inside the turbine device due to the rotating flow leaving the excluder in the opposite direction of the rotor blade or impeller rotation (5). This increased pressure and loading of the upstream side (intrados) (3) of the hydrofoil shaped rotor blade also creates a greater pressure differential between intrados and extrados (4) (the downstream side) of the rotor blades or impeller, resulting in the blades generating more lift in the direction of the rotation and more torque (6) in the direction of the rotation.

Figure 14:
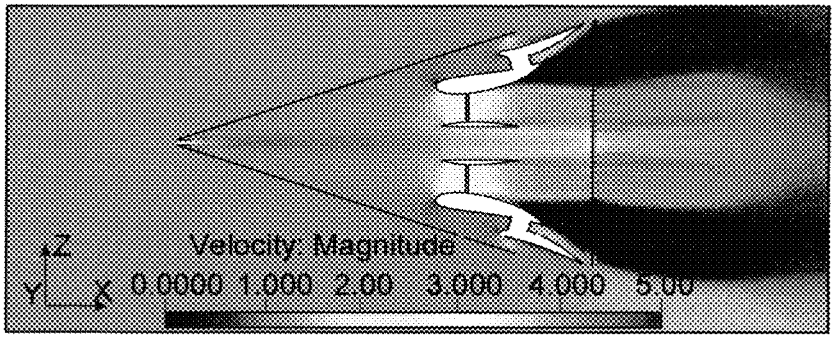
FIG. 14 is a CFD analysis showing fluid velocity and fluid acceleration across a section of a hydrokinetic turbine fitted with the two WDE devices illustrated in FIG. 13.
Figure 15:
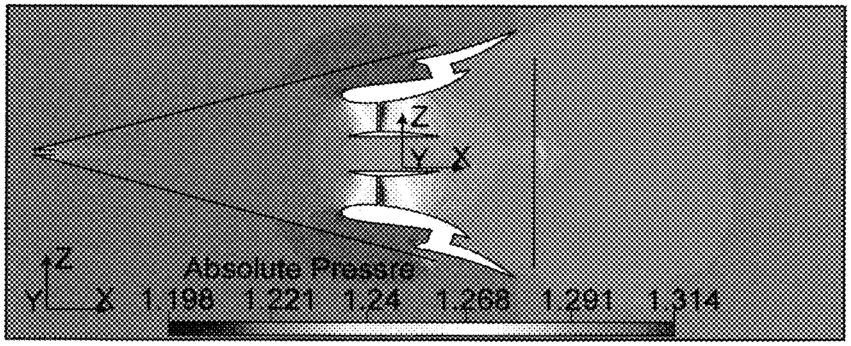
FIG. 15 is a CFD analysis similar to FIG. 14, but showing fluid pressure across a section of a hydrokinetic turbine fitted with the two WDE devices illustrated in FIG. 13.
Figure 16:
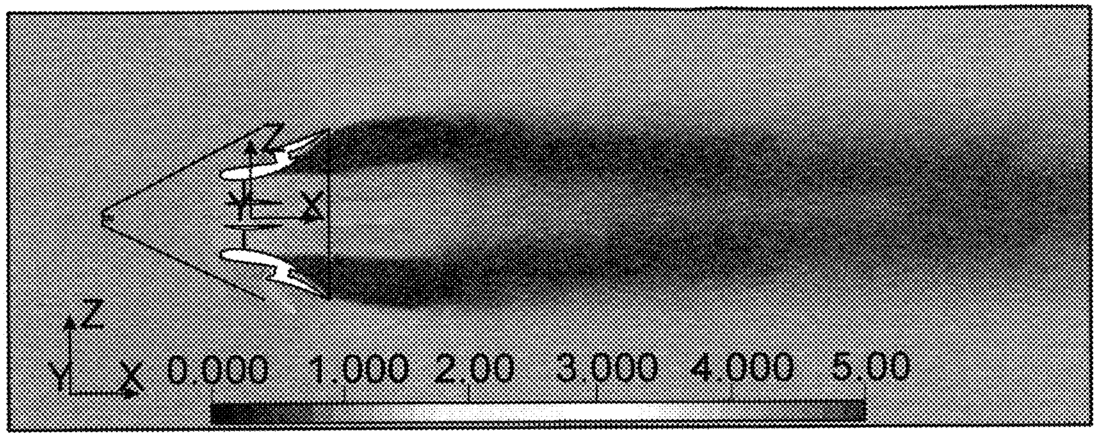
FIG. 16 is similar to FIG. 14, but shown at a different scale and including streamlines for flow redirection.

This increased loading of the rotor blades has the same effect on the turbine rotor 31 that an increased rotative speed of the blades would have, although the RPM of the rotor is not necessarily increased. This increased loading is mainly due to the vorticized/rotating flow leaving the front arrangement, preferably in opposite sense of the blade rotation, a feature which is comparable to a (fictitious!) increase of the rotative speed of the rotor, impeller or propeller. (An increased rotative speed of the rotor in the fluid would create more thrust, which then results in an increased efficiency or higher power/energy output of the turbine.) With this vorticized/rotational flow-inducing arrangement, the additional thrust and torque is achieved by the hydrodynamic effect of a higher load on the rotor blades rather than increasing the rotative speed. The effects of this vorticized/rotating flow and the increased pressure, thrust and flow acceleration become visible in the CFD analysis (FIGS. 14, 15, 16).

Figure 3:
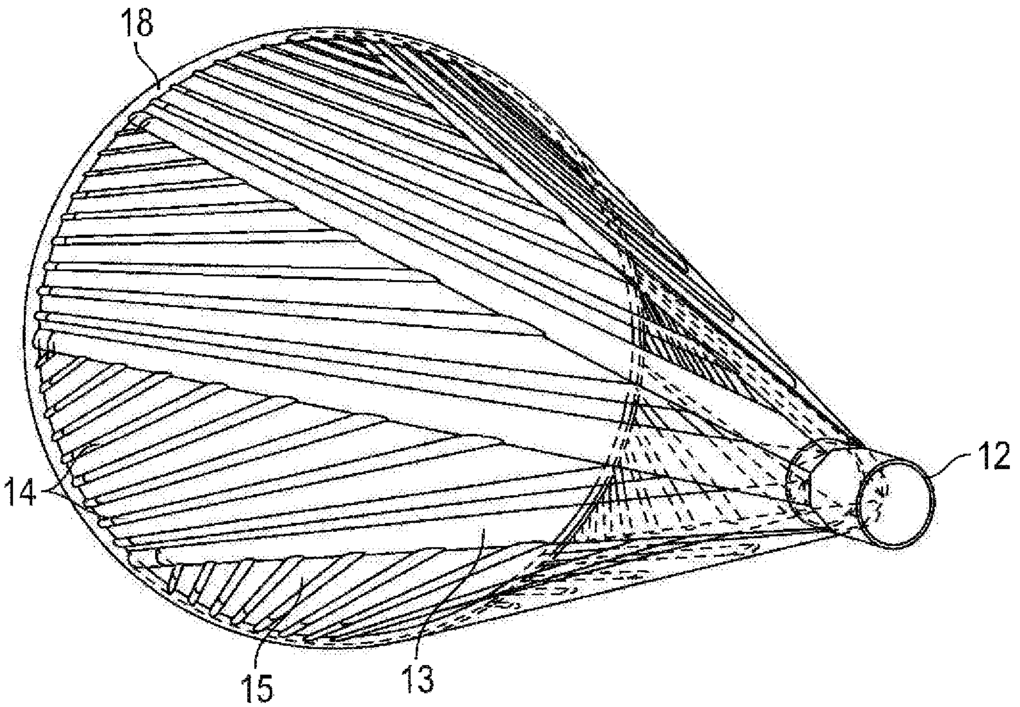
FIG. 3 is a schematic perspective view showing one embodiment of a device of the invention.
Figure 4:
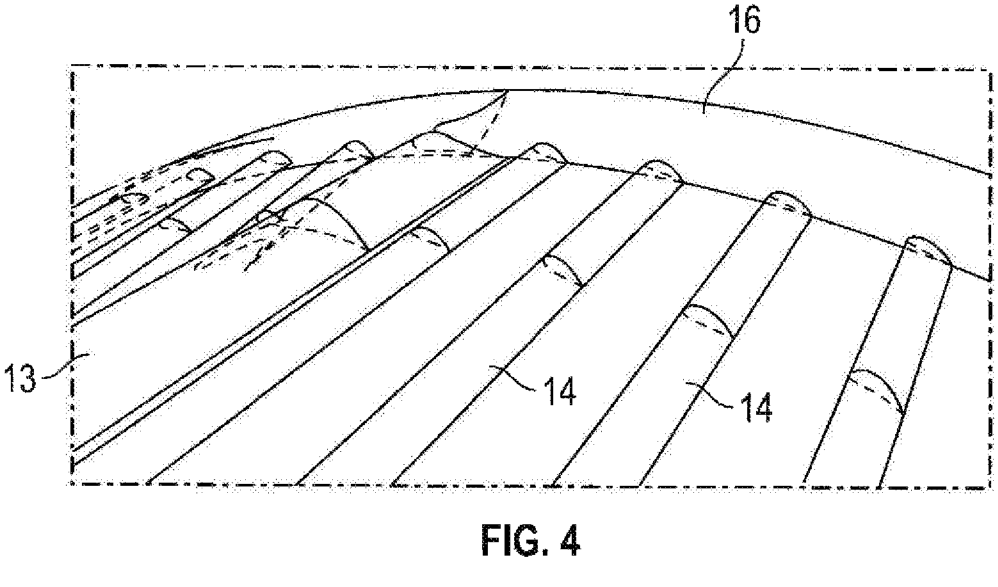
FIG. 4 is a detailed perspective view showing cross-sectional configurations of rod members in the devices according to the invention.
Figure 5:
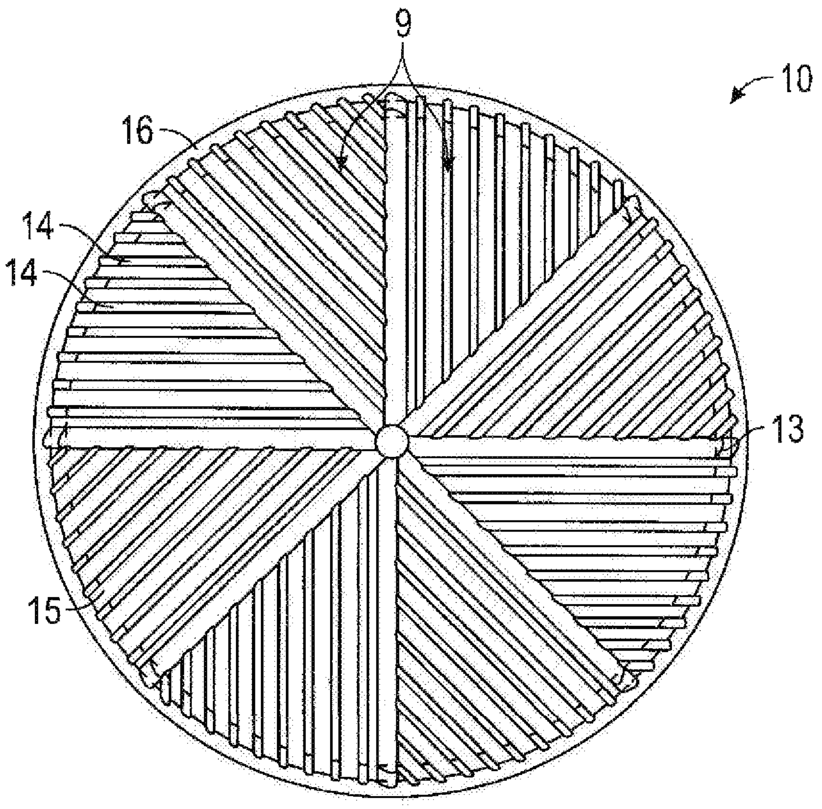
FIG. 5 is an end view of the device shown in FIG. 3.
Figure 6:
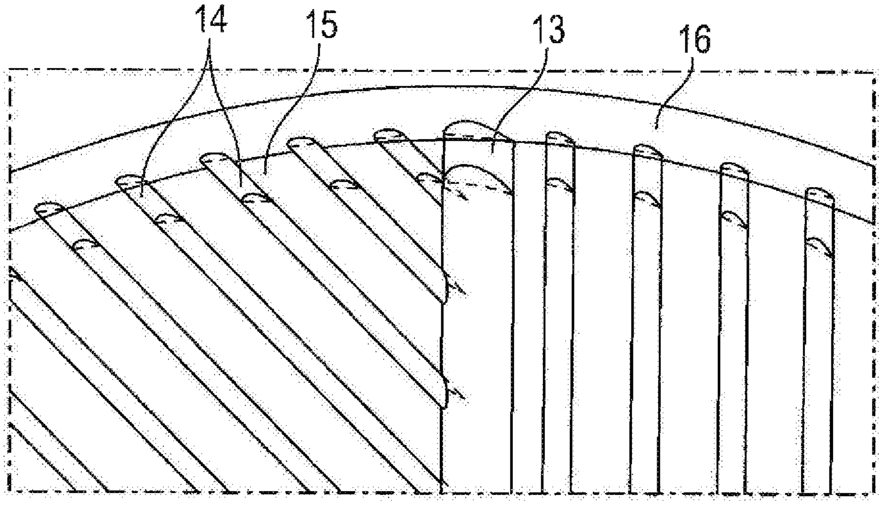
FIG. 6 is an exploded partial view of a portion of FIG. 5, showing cross-sectional configurations of rod members in the devices according to the invention.
Figure 7:
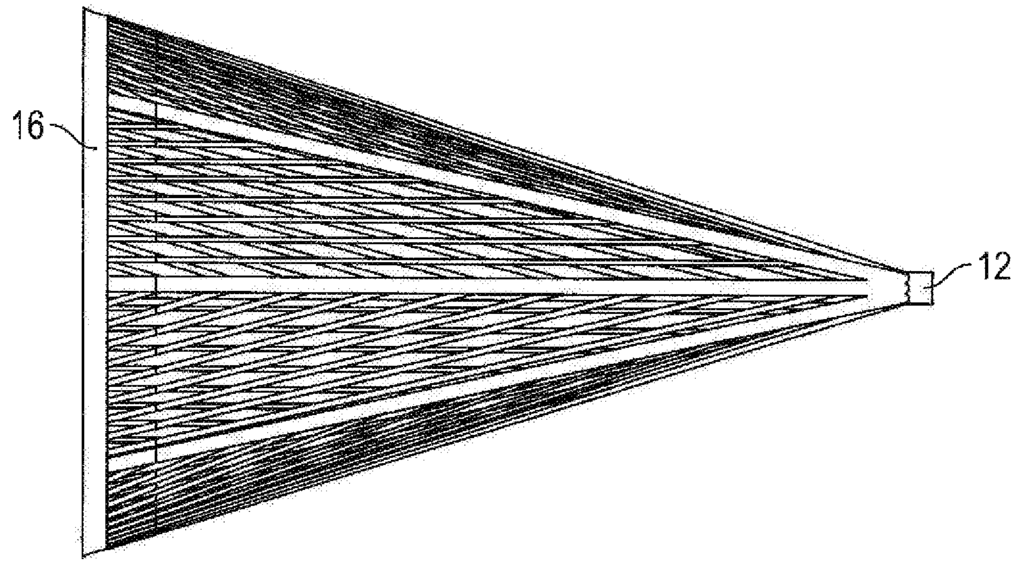
FIG. 7 is a side plan view of the device shown in FIG. 3.
Figure 8:
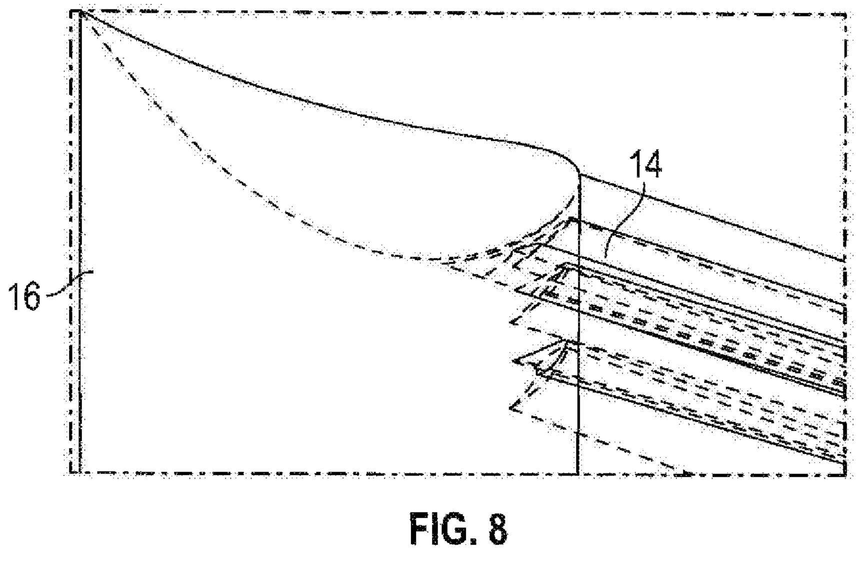
FIG. 8 is an exploded partial view of a portion of FIG. 7, showing cross-sectional configurations of rod members and a connecting support member in the devices according to the invention.

To induce the vorticized/rotational flow in one preferred embodiment, first, the orientation/attachment rods (13) and the deflector rods (14) making up the arrangement are deployed in an array (9) that has the effect of inducing a rotational flow, one typical preferred example of which is shown in the FIGS. 3, 4, 5, 6, 7 and 8 of drawings. FIG. 5 is an end view of the device shown in FIG. 3, showing the arrangement of multiple arrays (or sub-arrays) (9) of deflector rods (14) arranged in selected different orientations in a circumferential pattern around the center of the WDE, according to one preferred embodiment. Any design or array that produces rotary flow is suitable, with the objective of producing the most rotational flow with the least flow resistance loss. Thus, although any cross-sectional shape is suitable for the rods (or blades), e.g., round, flat, oval, etc., a second, preferred feature of the invention is to provide that at least some and preferably all of the individual orientation/attachment rods (13) and the deflector rods (14) of the front arrangement (10) have a hydrofoil/airfoil-shaped cross-sectional shape, with the extrados of the hydrofoil/airfoil shaped rods being on the upstream side of the rods and the intrados of the hydro/airfoil shaped rods being on the downstream side of the rods. In other words, the leading edge of the hydrofoil/airfoil shaped rods point into fluid current and the trailing edge of the hydrofoil/airfoil shaped rods point away from the fluid current. It is also preferred that the rear/aft attachment ring (16) for the rods (13), (14) has a hydrofoil-shaped cross-section, as seen in FIG. 4.

These hydrofoil/airfoil shaped rods direct the fluid, water or air into the direction intended by the orientation of the hydrofoil/airfoil, redirecting and giving the fluid entering the turbine-like device a rotational motion, preferably the opposite direction of the rotation of the turbine/rotor/propeller blades or impeller (FIGS. 1, 2). With the usage of this arrangement, particularly as a WDE, the flow direction of the fluid is now not just purely axial but has a radial component to it. The flow also has a degree of acceleration to it, due to the hydrofoil/airfoil effect of the preferred orientation and cross-sectional shape of the rods (13) and/or (14).

Figure 9:
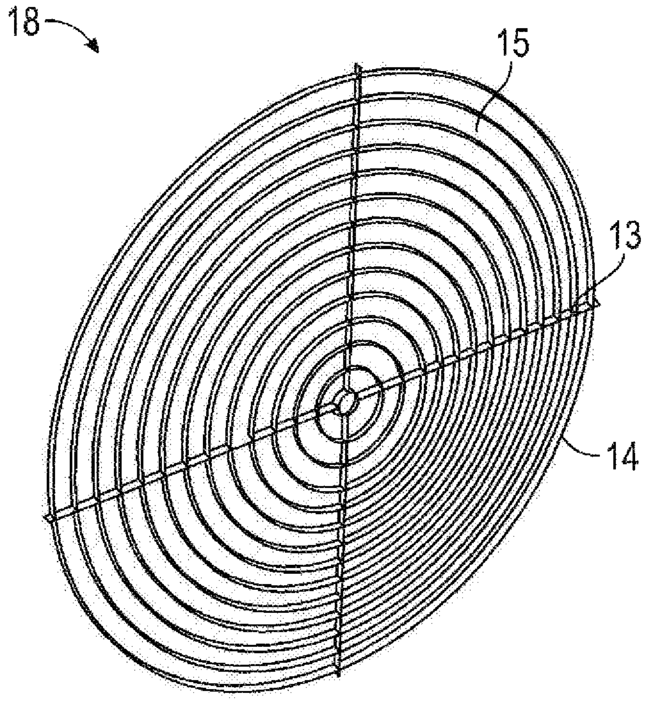
FIG. 9 is a perspective view of another embodiment according to the invention.

In one preferred embodiment, the optional rear-mounted arrangement (18) (FIGS. 9, 10, 11, 12), which can also preferably serve as a secondary WDE device, may be additionally or optionally located on the back/downstream side of a turbine-like device (8), to induce/create/increase a low-pressure field/area downstream of its position. This low-pressure field/area-inducing device (18) can have any configuration of rods that is suitable for reducing the pressure field/area downstream; however, most preferable is to provide an arrangement of hydrofoil/airfoil shaped deflector rods (14) in the form of concentric rings, connected by several radially-extending hydrofoil-shaped connector rods (13) (FIGS. 9, 11). This low-pressure field/area-inducing device (18) further enhances the efficiency of the turbine-like device (8), by creating an additional or increasing an existing negative pressure field/area at the exit of and behind the turbine-like device. This negative pressure field will accelerate the flow through the rotor section of the turbine-like device, by aspirating the water through the rotor section from behind the turbine-like device and accelerating the flow-through speed. This effect will further enhance efficiency or increase performance of any turbine-like device, in comparison to the use of other WDE devices or even the absence of such a WDE device.

Figure 10:
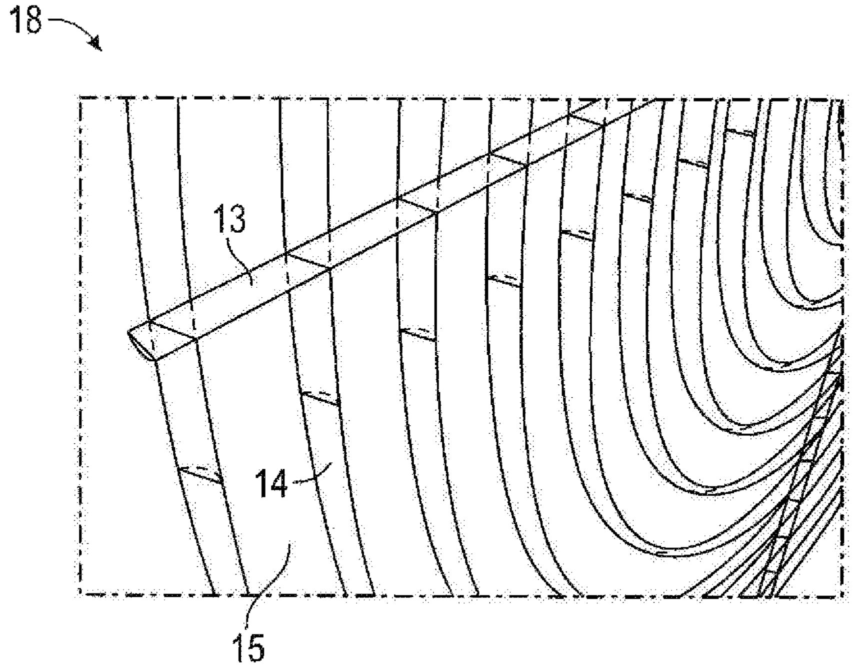
FIG. 10 is a detail view of a portion of the device of FIG. 9, showing cross-sectional configurations of rod members in the devices according to the invention.
Figure 11:
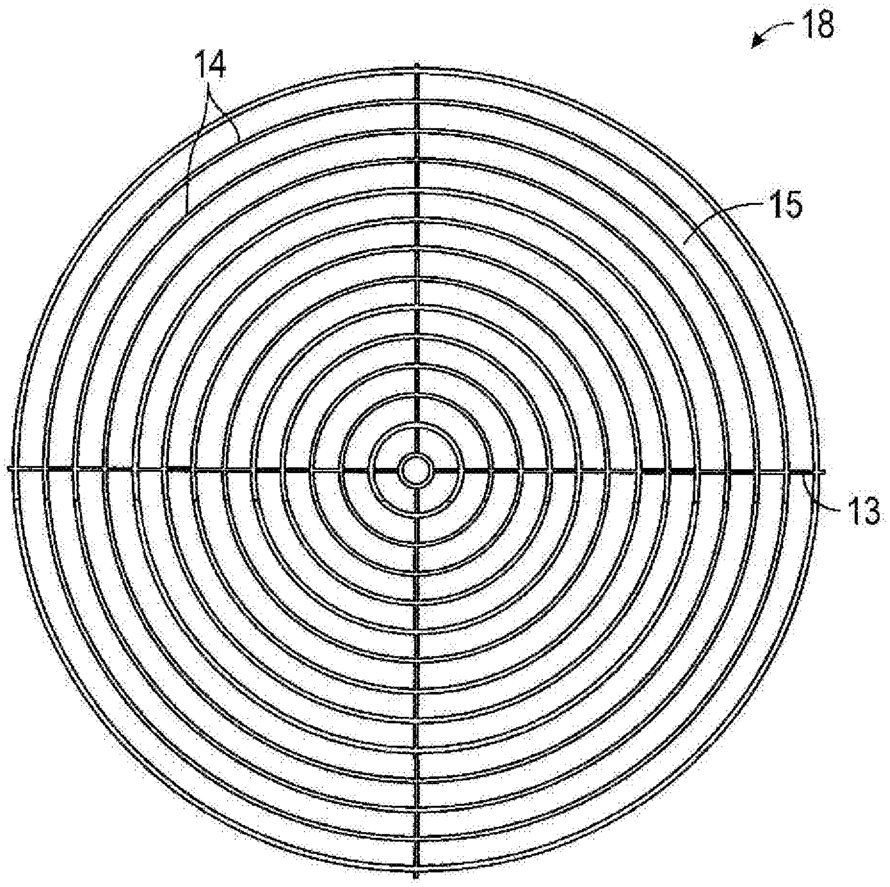
FIG. 11 is an end view of the device of FIG. 9.
Figure 12:
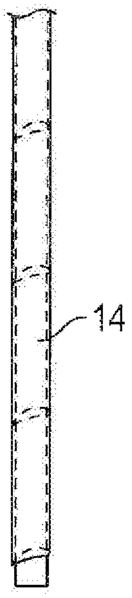
FIG. 12 is a detailed side view of a rod showing its cross-sectional configuration.

The hydrofoil/airfoil shaped concentric rings of rods (14) are oriented with the extrados of the hydrofoil/airfoil rings facing at an angle toward the center of the ring and the intrados of the hydrofoil/airfoil rings facing the outside of the ring (FIGS. 10, 12). This angle can be generally between about 2° and 35°, and more preferably between about 5° and 20°, and can be different in different areas of the arrangement. This will deflect the water away from the center and toward the outside perimeter of the turbine-like device (8), thereby to create the negative pressure field/area located in the center and downstream of the exit of the turbine-like device. Thus, there are two separate causes for the negative pressure field/area, namely, the re-direction of the flow of the fluid by the orientation of the ring elements, and separately by the flow-accelerating effect produced by the hydrofoil/airfoil configuration of the ring elements. Either feature can be used separately, or they can preferably be used in combination, as illustrated in the preferred embodiment of FIGS. 10 and 12. The effects of this low-pressure field/area inducing device and the decreased pressure behind the device and flow acceleration become visible in the CFD analysis (FIGS. 14, 15, 16). This low-pressure field/area inducing device will also prevent any wildlife or debris to enter the rotor section from behind a turbine-like device.

Figure 13:
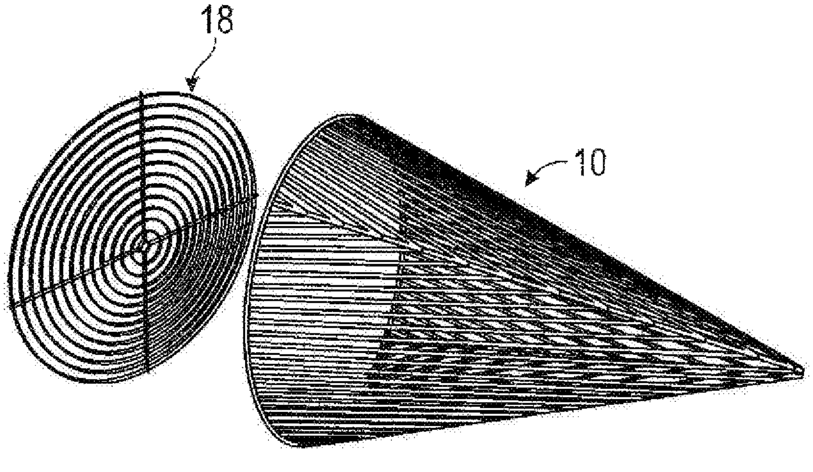
FIG. 13 is a perspective view of two embodiments of the invention that can be used together in combination with a turbine-like device.

The design of these fluid dynamic arrangements is scalable in size (FIG. 13), which means they can easily be adapted and optimized for any given size of turbine intake and for different flow speeds and flow volumes and different densities of the fluid with only minor changes to the hydrofoil/airfoil shapes. These hydrofoil/airfoil shapes may be modified in shape/cross-section, cord length, cord thickness, incidence/angle of attack, aspect ratio and size to have the optimal effect on the specific fluid they will be operating in. The hydrofoil/airfoil shapes will preferably also be optimized for the flow velocity of the fluid that is present at any given location/environment in which a turbine-like device is designed to be used. All these adjustments to the shapes for optimization are minimal, and the principle of functionality remains exactly the same. By adjusting the before-mentioned parameters, the arrangements of this invention can be optimized for a vast number of different operational applications. CFD is one very useful tool for carrying out optimization in accordance with the foregoing description.

The arrangements (10) and/or (18) may also act as a WDE to protect the intake of any turbine-like device (8). These arrangements have the added advantage that they are also designed to increase the environmental friendliness and protect the internal parts of the turbine-type apparatus in front and/or behind which they are placed. Thus, the most preferred embodiments of the invention are represented by a turbine-like device (8) in combination with one or both of the accelerated and/or redirected flow-inducing and/or low-pressure field-inducing arrangements described above. See, e.g., FIG. 17.

The size of the wildlife and debris to be excluded or prevented from entering the rotor section of a turbine-like device is determined by the spacing of the hydrofoil/airfoil shaped array of deflector rods (13), (14) on the forward excluder (10) and/or deflector rings the rear excluder (18). Deflector rods and deflector rings preferably run parallel in order to have equal distance/spacing of the deflector rods/rings along the full length of each individual pair of rods/rings and assure uniform size of wildlife or debris to be deflected and excluded.

The accelerated and/or redirected flow-inducing, preferably a vorticized/rotational flow-inducing and/or low-pressure field/area inducing arrangements according to the invention have the purpose of increasing the performance, power/energy output and efficiency of any rotating turbine-like devices, and further optionally and advantageously provide the function of serving as wildlife and debris excluding (WDE) devices for the turbine-type devices.

With the foregoing explanation of the principles by which the devices of the invention operate, it is apparent that there are a multitude of different physical designs/configurations that can be used to achieve an accelerated and/or redirected flow of fluid at or near the inlet of a turbine-like device and/or at its outlet. One particularly preferable type of design, which produces a vortex/rotational acceleration and redirection of fluid, has been described in detail above and in the accompanying figures of drawings, to illustrate the broader principles and scope of the invention. This disclosure/illustration is not intended to be in any way limiting of the invention. Further, it should also be clear that the accelerated and/or redirected flow-inducing, preferably a vorticized/rotational flow-inducing, and/or low-pressure field/area inducing arrangements according to the invention can be used independently of their serving also as WDE devices.

The accelerated and/or redirected flow-inducing, preferably a vorticized/rotational flow-inducing and/or low-pressure field/area inducing arrangements according to the invention can effectively work in any type of fluid and can be optimized to have the maximum effect on the fluid in which they operate, with minor adjustments to the preferably hydrofoil/airfoil shaped deflector rods of the devices. Preferably, the devices play the dual role of enhancing the efficiency of the turbine-like machines with which they are employed, while at the same time serving as WDE devices. In their preferred employment, the arrangements of the invention can effectively work on any size of turbine-like device, and can be optimized to have the maximum effect on the fluid in which they operate, with minor adjustments to the hydrofoil/airfoil shaped deflector rods of the devices.

As noted above, the accelerated and/or redirected flow-inducing, preferably a vorticized/rotational flow-inducing and/or low-pressure field/area inducing arrangements according to the invention can be utilized in connection with a wide variety of turbine-like devices. Most preferably, arrangements of the invention are employed in combination with a turbine-like device that is typically composed of three main components, a) a flow accelerator shroud, b) an optional annular diffuser following the flow accelerator shroud, and c) a main rotor which is built into the accelerator shroud but is a separate part. Some of these components typically comprise several different sub-parts that are assembled to be one part of the turbine. Preferred turbine-like devices are those described in published patent application WO 2016/130984 A2. The preferred aspects of these turbine-like devices are also described here.

The Flow Accelerator Shroud with the Annular Diffuser

Figure 18A:
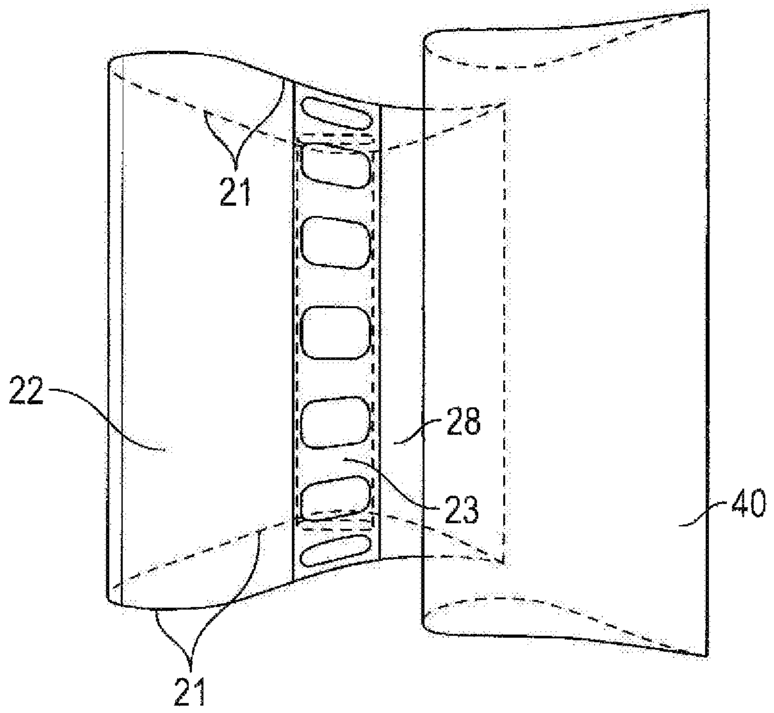
FIG. 18A is a partial cross-sectional view of an S-shaped/double-curved hydrofoil accelerator shroud, in an arrangement as shown in FIG. 21, with annular diffuser.
Figure 18B:
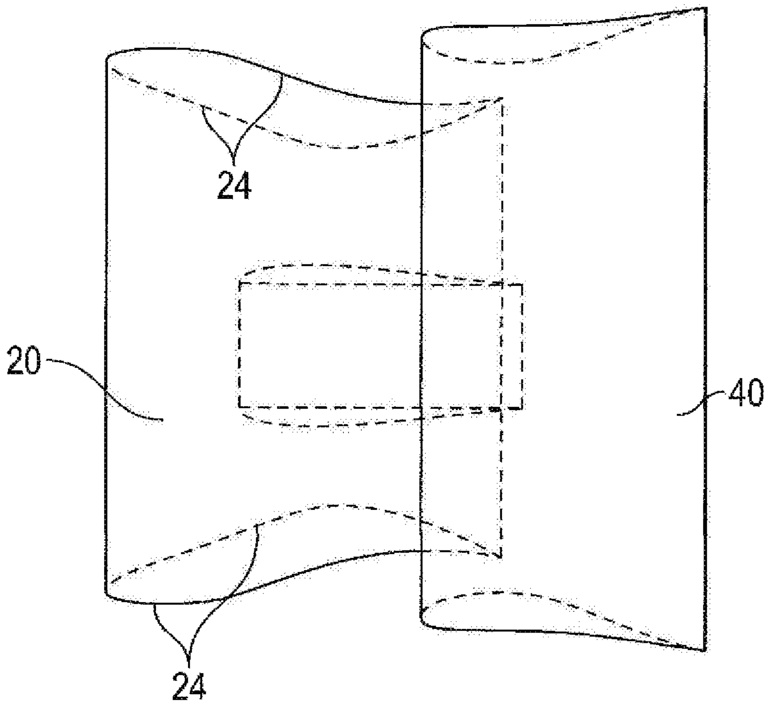
FIG. 18B is a partial cross-sectional view of a non-S-shaped hydrofoil accelerator shroud, in an arrangement as shown in FIG. 21, with annular diffuser.
Figure 22:
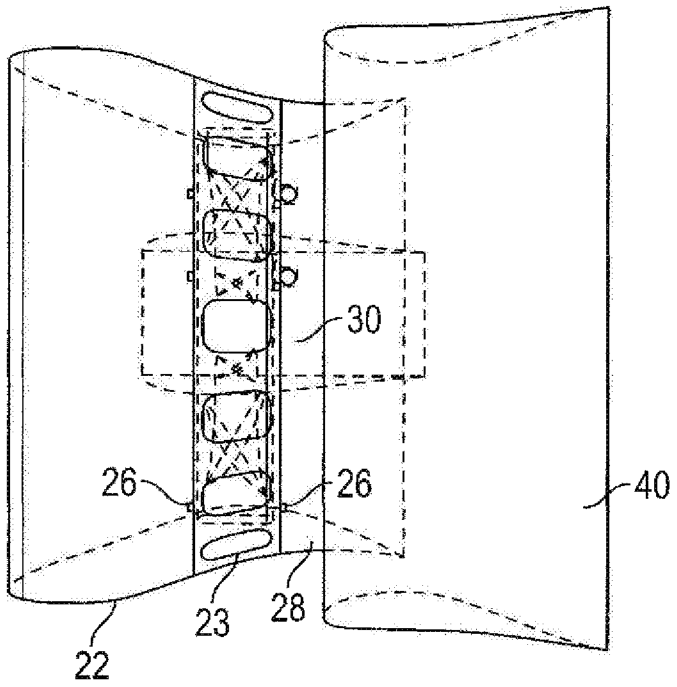
FIG. 22 is a cross-sectional view the entire turbine of FIG. 21, with central rotor section in place.
Figure 23:
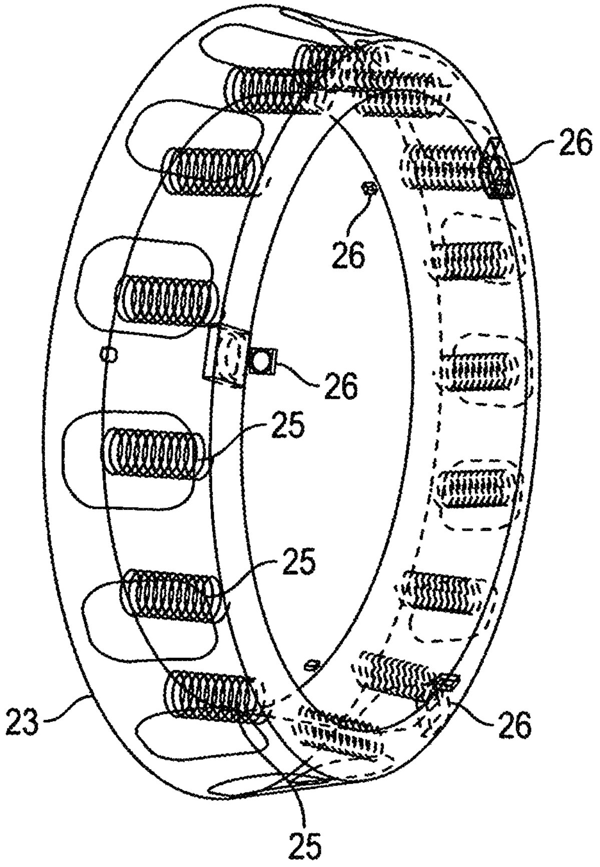
FIG. 23 is an isolated perspective view of the accelerator shroud, schematically showing the placement of coils.
Figure 24:
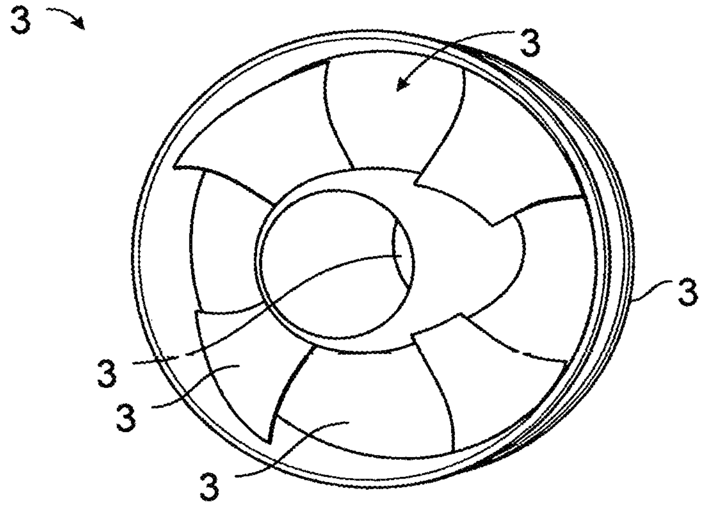
FIG. 24 is a three-dimensional view of the rotor section alone of the embodiment of FIG. 21.
Figure 25:
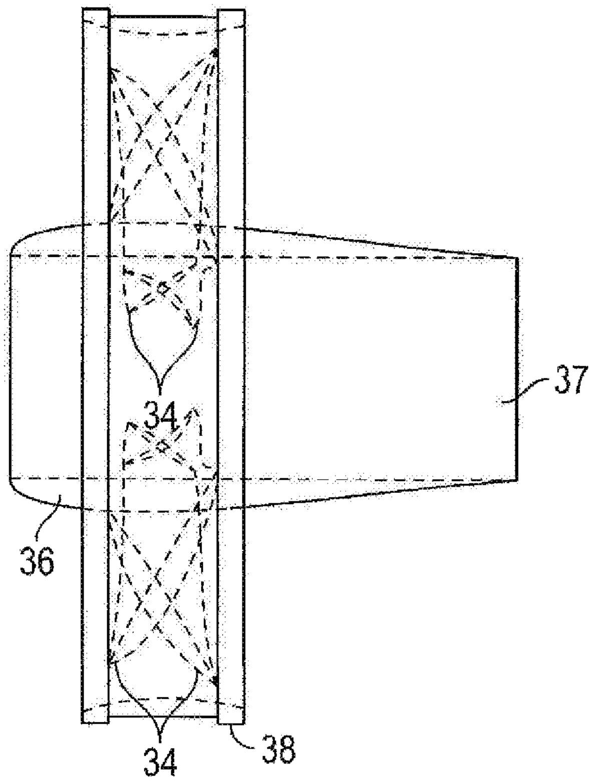
FIG. 25 is a schematic side view of the rotor section of FIG. 21, showing one of the hydrofoil shaped rotor blades, the rotor blade shroud and the hydrofoil shaped center hub.
Figure 26:
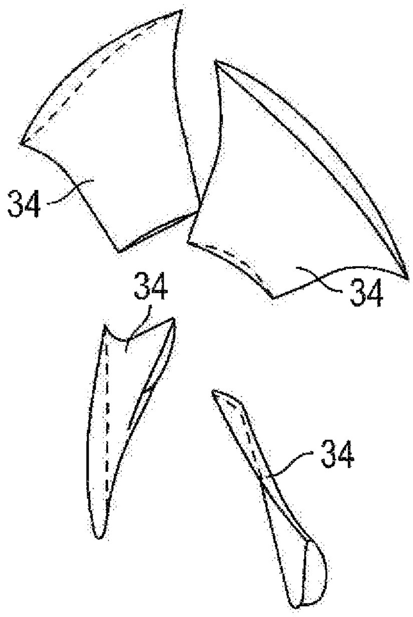
FIG. 26 is a perspective view of four rotor blades alone in the embodiment of FIG. 21.
Figure 27:
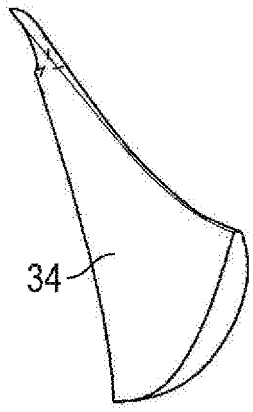
FIG. 27 is an isolate perspective view of a single exemplary rotor blade.
Figure 28:
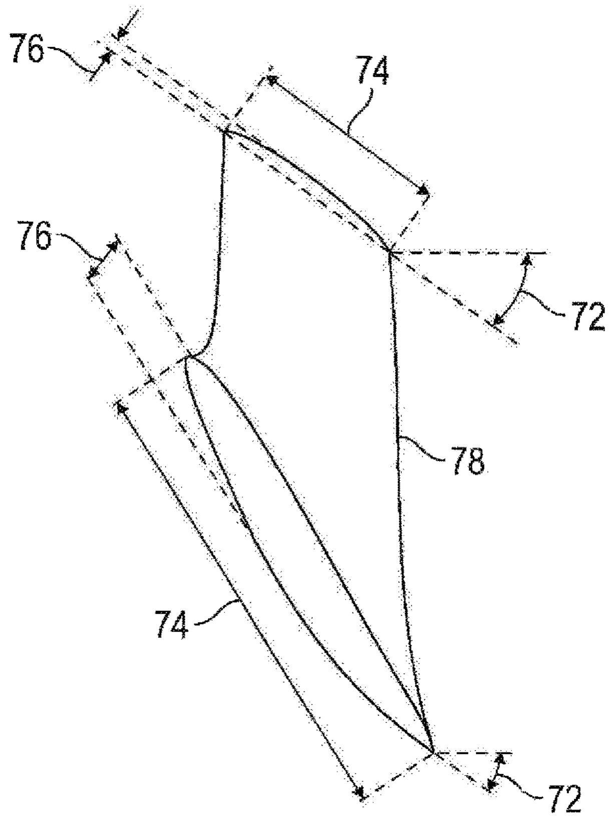
FIG. 28 is a cross-sectional view of one embodiment of a rotor blade, illustrating certain preferred features, including the variable angle of attack, variable cord length, and variable thickness of profile and twist.
Figure 29:
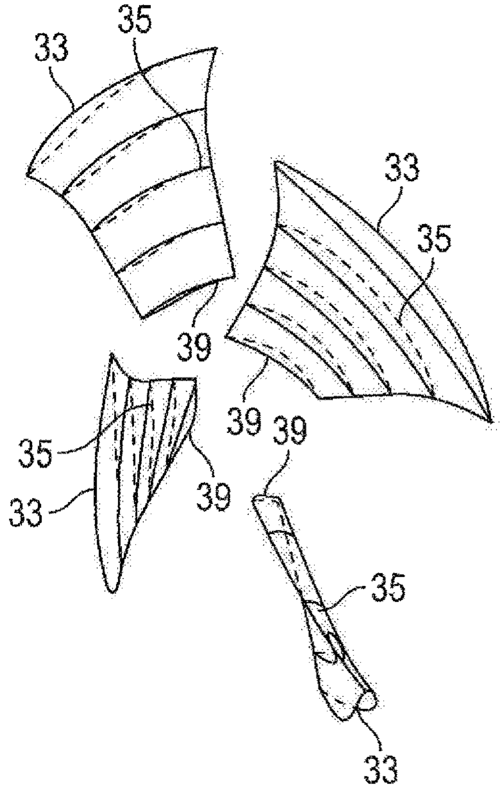
FIG. 29 is an isolated perspective view of a four-rotor blade embodiment with cross-sections of hydrofoil shapes of the blades.
Figure 30:
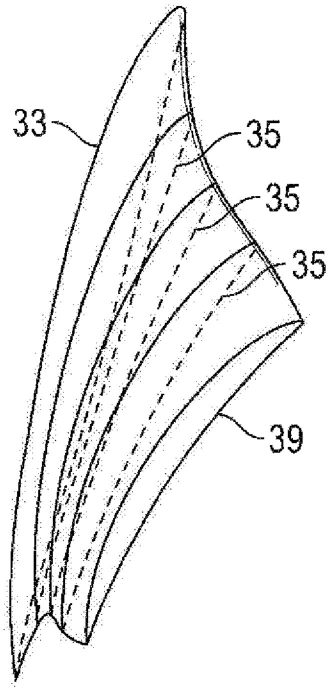
FIG. 30 is a perspective view of single rotor blade alone with cross-sections of hydrofoil shapes.
Figure 31:
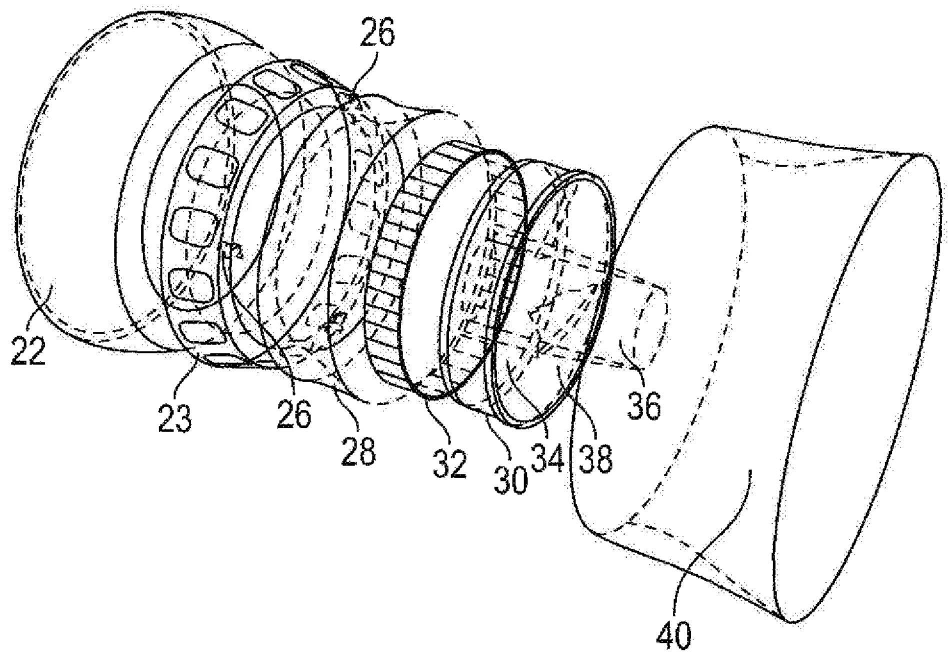
FIG. 31 is an exploded perspective view schematically showing all components in partial cross-section according to one embodiment of the invention.
Figure 32:
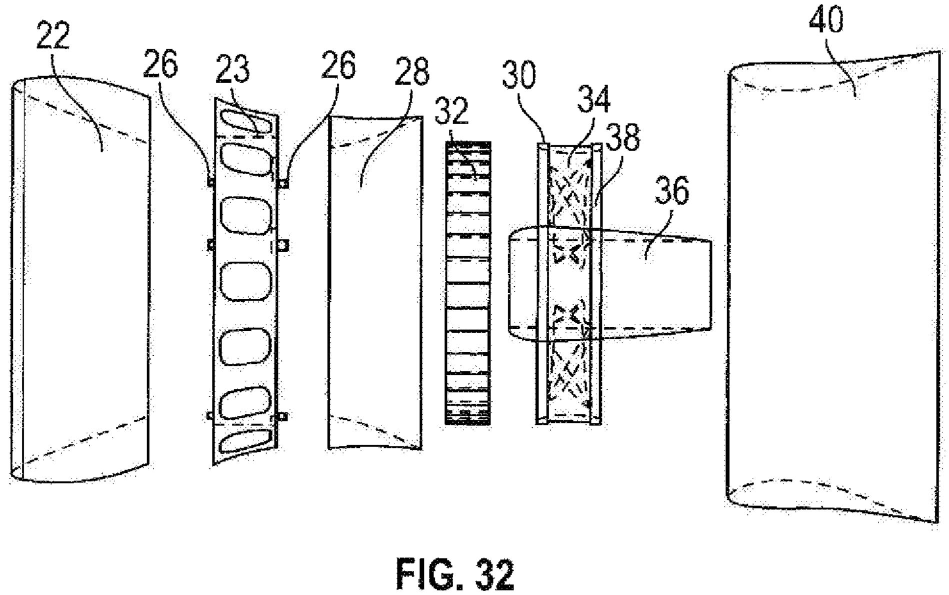
FIG. 32 is an exploded view of the turbine of FIG. 19, showing all components in a schematic side view and partially in section.

Referring now to FIGS. 18A, 18B, 21 and 31, the flow accelerator shroud (20) embodies the most complex hydrofoil shape. It preferably has an asymmetrical hydrofoil shape and in some embodiments an S-shaped/double-curved hydrofoil shape (FIG. 18A), or in other words a generally S-shaped double-curved configuration (FIG. 22), to create a negative pressure field behind the shroud in order to accelerate the water flow through the rotor section (30) of the turbine. The cross-section of the wall of the accelerator shroud may also be a hydrofoil shape that is not an S-shaped double-curved, but resembles much more conventional hydrofoil shapes (FIG. 18B). The accelerator shroud accelerates the flow of the water on the inside of the turbine in comparison to the ambient flow speed around outside the accelerator shroud. The accelerator shroud is preferably composed of four pieces: entrance duct (22), the stator housing (24), the rotor blade shroud (38) (FIG. 24) and the aft fairing (28). These four components together preferably form a single shape, which is preferably the asymmetrical hydrofoil of the accelerator shroud, which in certain preferred embodiments has the S-shaped/double-curved hydrofoil shape. All four pieces are preferably faired together to form a perfectly smooth surface both inside and outside, over which the water flows without creating any significant turbulence.

The entrance duct (22) serves to funnel the water flow into the rotor section (30) and to lead the water flow onto and over the stator housing (23) on the outside of the accelerator shroud and over the rotor blade shroud (38) on the inside. This stator housing exterior surface and the rotor blade shroud interior surface are part of the overall shape of the accelerator shroud. The entrance duct also contains the forward thrust bearings that guide the rotor section during operation.

The stator housing (23) contains all the metallic, preferably copper, coils (25) that comprise the stator of the annular generator, as well as the conventional electrical wiring (not shown) to convey the electrical energy generated out of the turbine. The stator housing also contains the rotational roller/ball bearings (or other bearings or low friction polymer bushings) (26) on which the rotor section rotates.

The exterior surface of the rotor blade shroud (38) forms part of the accelerator shroud but is a separate part that is attached to the rotor blade tips (33) and rotates with the main rotor inside the accelerator shroud. It is described in more detail below.

The aft fairing (28) located behind the stator housing (23) and rotor blade shroud (38) leads the water flow to the exit of the accelerator shroud (20) and preferably has a feather edge (29) on the back end to avoid creating any turbulence or drag. The aft fairing also contains the aft/rearward thrust bearings (26) (FIG. 22) against which the rotor section is pushed while rotating.

Figure 19:
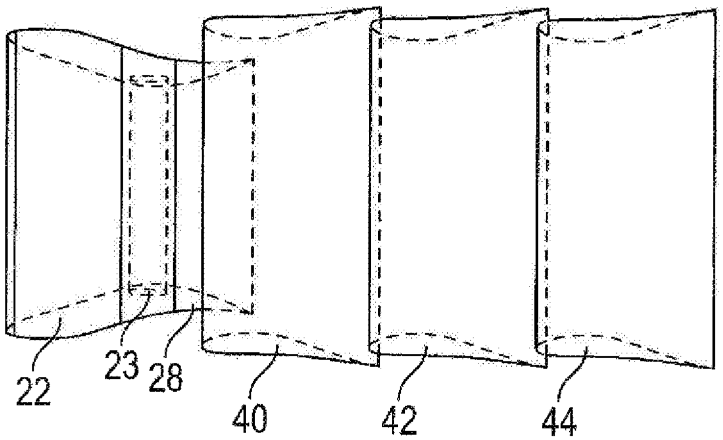
FIG. 19 is a partial cross-sectional view of another embodiment of an accelerator shroud, with multiple annular diffusers of similar diameters.
Figure 20:
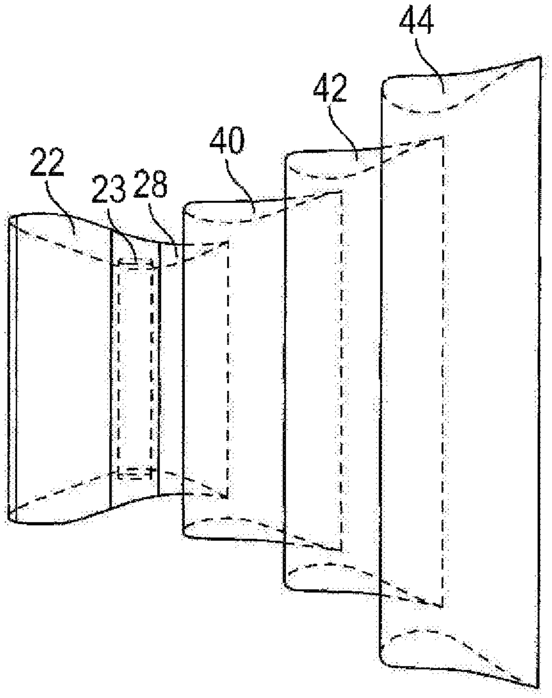
FIG. 20 is a partial cross-sectional view of another embodiment of an accelerator shroud, with multiple annular diffusers with different diameters.
Figure 21:
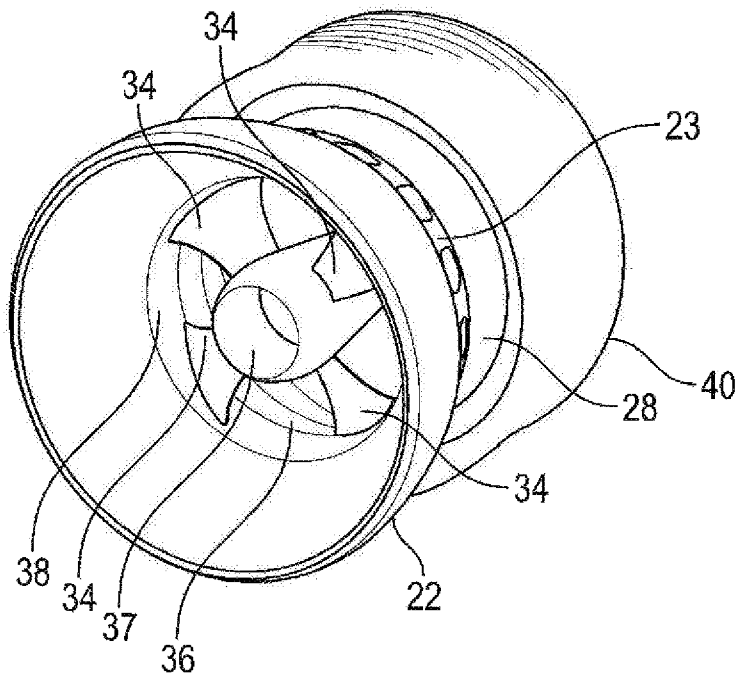
FIG. 21 is a three-dimensional view of one embodiment of an entire turbine with central rotor section.

The annular diffuser (40) is also preferably an asymmetrical hydrofoil shaped ring and preferably has a greater diameter than the accelerator shroud (20). The annular diffuser (40) is located behind the accelerator shroud and preferably overlaps somewhat over the aft end of the accelerator shroud (20). It works in a manner very similar to the accelerator shroud, further increasing the negative pressure field behind the turbine. Because of the cooperation and resulting synergistic effect of the accelerator shroud and the annular diffuser, there is a greater augmentation of flow speed through the rotor section. Generally, at a position relatively closely (e.g., from about 4 to 6 inches) behind the trailing edge of the (final) annular diffuser, which is preferably a feather edge, the rear wildlife and debris excluder is attached. There may be some instances in which it may be advantageous, e.g., specific water flow conditions, to employ one or more annular diffusers, such as second annular diffuser (42) and maybe even a third annular diffuser (44), positioned one behind the other. (FIGS. 19-20)

The Rotor Assembly

Turning now to FIGS. 24-30, the hydrokinetic turbines preferably have an open center (37). The extremities of the rotor blades (34) travel through the water at a higher speed and therefore create substantially more lift and allow substantially greater energy extraction. Depending on the size of the turbine, the flow speed at a location of the installation and other site-specific needs, the ratio between open center and blade and hub size can be anywhere from about 40% blade: 60% open space, to about 80% blade: 20% open space. Turbines of this type advantageously use the major portion of the overall diameter along the perimeter of the rotor section to produce lift, typically more than about 60% and more preferably approximately ⅔ of the diameter. This leaves the remaining minor portion, e.g., in a preferred embodiment approximately ⅓ of the overall diameter in the center open (37). These designs create a more efficient rotor section that uses a smaller blade area with less weight, with less wetted area and less drag, which can rotate at higher rpm rates and allow more energy to be extracted. There is also a secondary effect that is of further benefit to the wildlife and debris excluder that is described below.

The center hub (36, 80). that is preferably annular and surrounds the preferably open center (37), is also used for attaching the rotor blade roots (39). (FIGS. 25-26 and 31) A center hub (80) that is solid preferably has a symmetrical hydrofoil shape, whereas the center hub (36) with open center preferably has an asymmetrical hydrofoil shape, with the extrados being toward the outside of the turbine and the intrados facing toward the center of the hub. The lift created by the center hub helps further increase the negative pressure field behind the turbine created by the accelerator shroud (20) and the annular diffuser (40). This effect increases the acceleration of the water flow through the rotor blade section and contributes to the synergistic effect and resultant higher power generation.

The rotor blade shroud (38) (also called the outer ring of the main rotor) is where the extremities/tips (33) of the blades (34) are attached. (FIG. 24) This rotor blade shroud (38) forms a part of the hydrofoil shape of the accelerator shroud (20). It is a separate element from the accelerator shroud allowing it to rotate with the rotor blades (34), but the surface of the rotor blade shroud is preferably perfectly in line with the inside surface of the accelerator shroud (20) to create one smooth curve of both inside surfaces, accelerator shroud and rotor blade shroud. The outside surface of the rotor blade shroud, which faces the stator housing (23) interior surface, is preferably recessed into the accelerator shroud and has a flat surface where the permanent magnets (32) are located which rotate past the copper coils (25) of the stator to produce the electrical energy. The rotor blade shroud (38) also eliminates tip vortex and reduces drag and turbulence, resulting in higher efficiency and greater energy extraction.

Referring now to FIGS. 25-30, the efficiency of the rotor blades (34) is increased by preferably using an asymmetrical hydrofoil shape, which is also preferably optimized, as explained below. This shape, also called the cord or cross-section (35) of the hydrofoil, results in an increase of the efficiency of each blade, reduces it in size and decreases the number of blades relative to other designs. A smaller rotor blade (34) has less wetted area, thus producing less drag. The amount of lift a hydrofoil shape generates is determined by the shape of cord/cross-section (35) (FIG. 30), the length of cord (74) and the thickness of cord (76) of the hydrofoil. (FIG. 28) In designs according to the invention, one or both, the length of cord (74) and/or the thickness of cord (76) preferably change between the blade root (39) and the blade tip (33). This optimizes the lift created by the hydrofoil shape in relation to the speed it travels through the water. The number of blades put into the rotor section of designs according to the invention may vary depending on the size of the turbine and the flow speed of the water in a particular application.

The angle/incidence (72) (FIG. 28) at which the rotor blades are installed is also a variable that can be adjusted for the purpose of optimizing the angle of attack or incidence of the blade traveling through the water. It is preferred to use an optimum angle which is determined by the rpm of the rotor to produce a laminar or at least a near laminar flow of the water over the blade surface. If this flow is turbulent or significantly non-laminar, the hydrofoil creates less lift, and therefore less energy can be extracted. The tip of the blade travels through the water faster than the root of the blade, due to the fact that it travels a longer distance to complete one rpm. Therefore, the incidence of the blade advantageously decreases gradually from the root (39) of the blade to the tip (33) of the blade, in order to be at the optimal angle. This change in angle is called the twist (78) of the blade. The twist is preferably designed to create a rotor blade maximum lift at every cross-section and therefore to increase the efficiency and the power extraction.

For preferred hydrofoil shapes to be optimal while they travel through the water at different speeds, they preferably have different lengths of cord (74) and different thicknesses of profile/cord (76). Preferably, the thickness (76) of the blade increases and/or the cord length (74) increases from the root of the blade toward the tip of the blade, i to increase the surface area where the blade travels though the water with higher speed and creates the greatest amount of lift. Thus, the blades most preferably increase in both size and thickness as they extend radially from the hub. These increases in cord length and thickness result in higher efficiency and greater power extraction.

The rotor blades hydrofoil shape (35), the length of cord (74), the thickness of profile/cord (76), the degree of incidence (72), and the twist (78) of each rotor blade, and the number of blades can advantageously be varied for each application, in order to adapt to site-specific flow conditions of the water and other locational needs.

The Wildlife and Debris Excluder(s)

Figure 17:
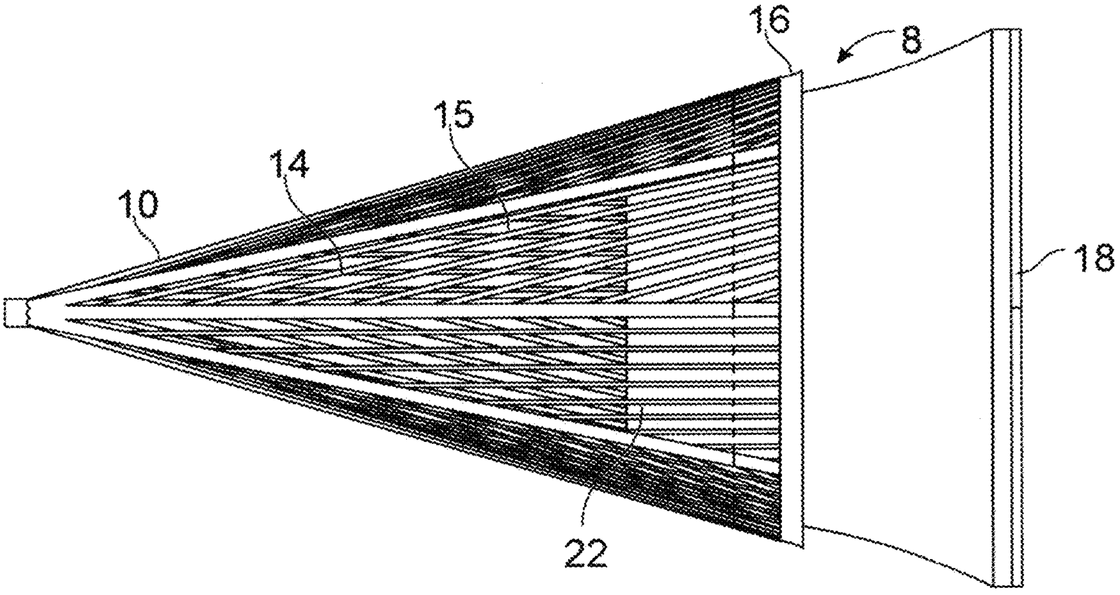
FIG. 17 is a cross-sectional view of an exemplary turbine, with front and rear wildlife and debris excluders.

Referring now primarily to FIG. 17, a preferred hydrokinetic turbine is one that deflects and keeps any marine life and floating or submerged debris above a specified size out of the hydrokinetic turbine's rotor. The size of marine life or debris that cannot enter the nozzle section of the turbine is specified by the spacing/distance (15) of the deflector rods (14) of the forward and rear excluder. In this invention the deflector rods, by design, run parallel to each other and are evenly spaced over their full-length to ensure that no distance between the rods (15) is greater in one place than in another. The distance of the spacing (15) is determined by the size and the species of marine wild life as well as the size of debris encountered to be excluded and to adapt to locational needs of specific sites of operation The hydrokinetic turbines employed according to the invention preferably have two wildlife and debris excluders, one (10) in front at the entrance (22) of the turbine and one (18) behind at the exit of the turbine. The front wildlife and debris excluder (10) is located in front of the turbine protecting the entrance (22) of the accelerator shroud (20), and is attached to the front end of the accelerator shroud as well as preferably to any support structure of the turbine. The deflector rods (14) of the excluder may be made of metal, fiberglass or synthetic materials with different diameters depending on the turbine size; from about ¼ inch on a small turbine and up to about 3 inches on very large units.

The first/forward wildlife and debris excluder (10) is preferably built so that the deflector rods on the forward end of the front excluder (14) form a generally cone-like shape. The deflector rods on the forward end are attached to a small ring (12) that preferably has the same inside diameter as the specified distance (15) between the insides of the deflector rods. On the back end, the deflector rods are preferably attached to a large ring (16) which is preferably greater diameter than the annular diffuser (40). The slope of the cone-like shape created by the difference between the forward ring (12) and the aft ring (16), to which the deflector rods (14) are attached, can be altered to adapt to different environmental needs. The front excluder is preferably positioned so as to slightly overlap the annular diffuser with a gap that is approximately the same size as the distance (15) between deflector rods, in order to maintain a finite size of wildlife and debris allowed to enter, it is designed to be cone-like shaped in order to shed off and divert any wildlife, debris, sea grass or whatever else may be floating in the stream of water about to enter the turbine.

The second/aft wildlife and debris excluder (18) (FIG. 17) is located behind the turbine exit and is attached to the trailing edge of the (final) annular diffuser. The rear excluder is preferably also comprised of a grill or mesh of equally-spaced rod members that are spaced apart from one another by the same pre-determined distance as the rods (14) in the front excluder, and in the case of the rear excluder, the most preferred configuration is a generally planar one. The rear excluder prevents larger sea life from entering into the rotor section from behind, even against the direction of the water current or also in the case of no current as for example during the change from an incoming to an outgoing tide. The deflector rods of the excluder are spaced to the same specified distance (15) as the forward wildlife and debris excluder to prevent any wildlife or debris larger than the specified distance from entering into the rotor section.

Figure 35:
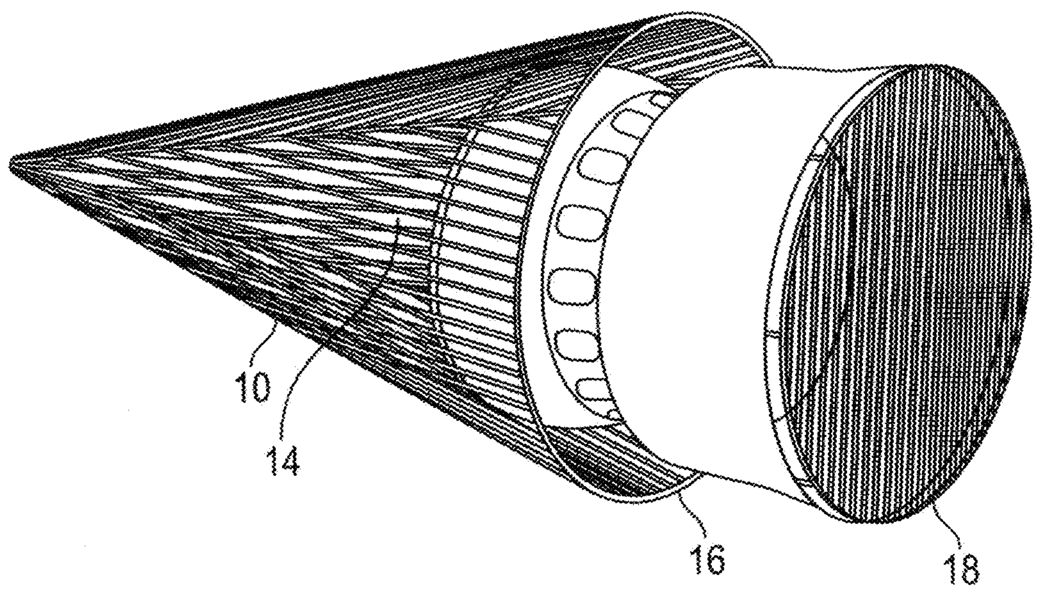
FIG. 35 is a perspective view of a turbine with a WDE attached.
Figure 36:
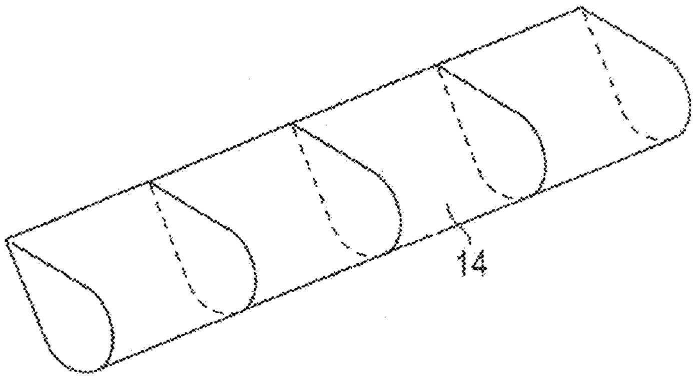
FIG. 36 is a detailed view showing the teardrop profile of the rods in FIG. 35.

FIGS. 35 and 36 show an embodiment of a WDE from Applicant's earlier application WO2016/130984 A2, referred to and incorporated by reference into this application. As described in the earlier application, the deflector rods (14) of the excluder may be made of metal, fiberglass or synthetic materials with different diameters depending on the turbine size; from about ¼ inch on a small turbine and up to about 2 inches on very large units. The deflector rods are preferably hydrofoil/teardrop (14) shaped in cross-section (FIG. 36) with the blunt end pointing into the water flow and the sharp ends being the trailing edge. This configuration serves to avoid turbulence in the water flow that could disturb the efficiency of one or more other components, such as the accelerator shroud (20), the annular diffuser (40) and/or the rotor blades (34).

The annular generator design preferably has magnets (32) mounted on the rotor blade shroud (38) and copper or other metallic coils (25) in the stator housing (24) which is preferably located inside the accelerator shroud (20). This design eliminates the need for a gearbox or transmission or hydraulic systems to mechanically extract and convey the energy out of the turbine. The preferred design employed in the present invention also eliminates the need to have center bearings, which thereby eliminates the need for any fixed structure whatsoever (e.g., shaft or hub) located within the flow area through the turbine. The absence of any fixed structure furthermore means that no struts or other elements are needed to support that fixed structure.

Figure 33:
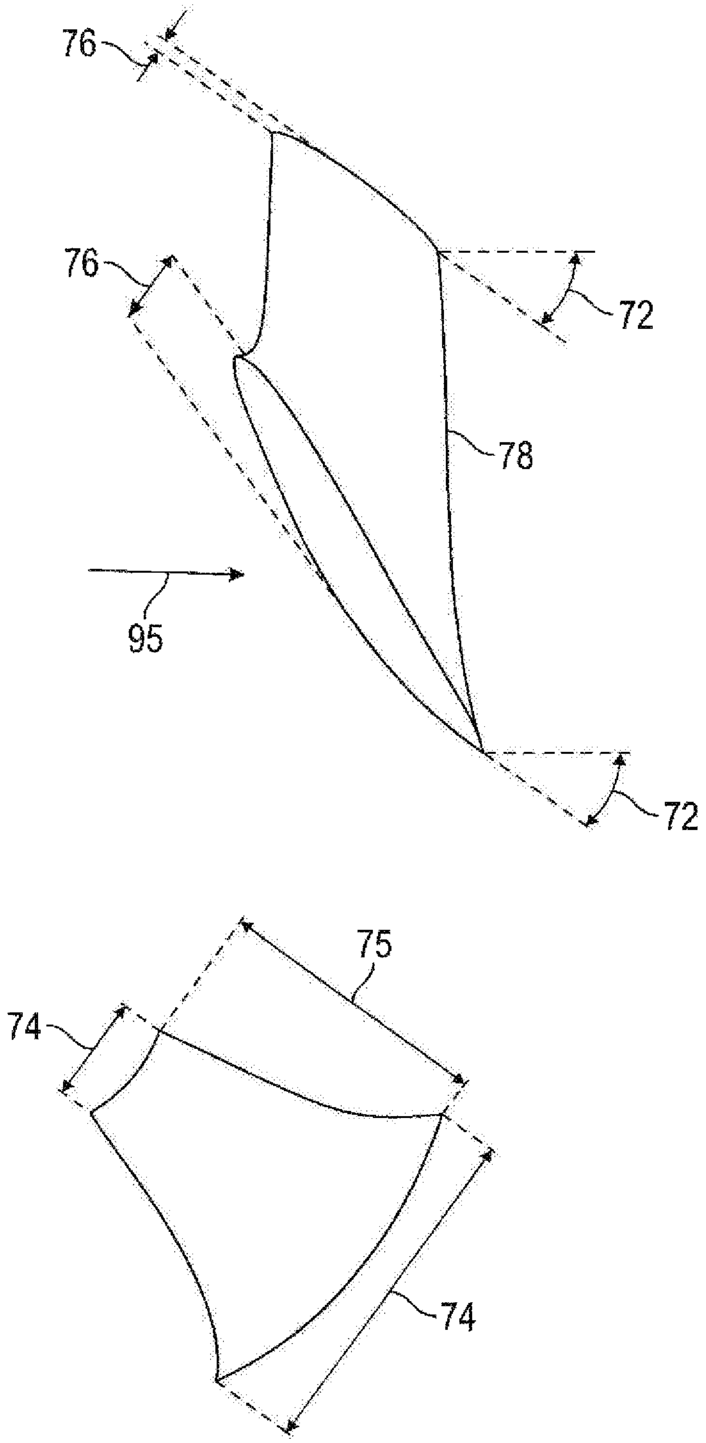
FIG. 33 is a schematic side view and front view of a rotor blade for use in a 3 kn current.
Figure 34:
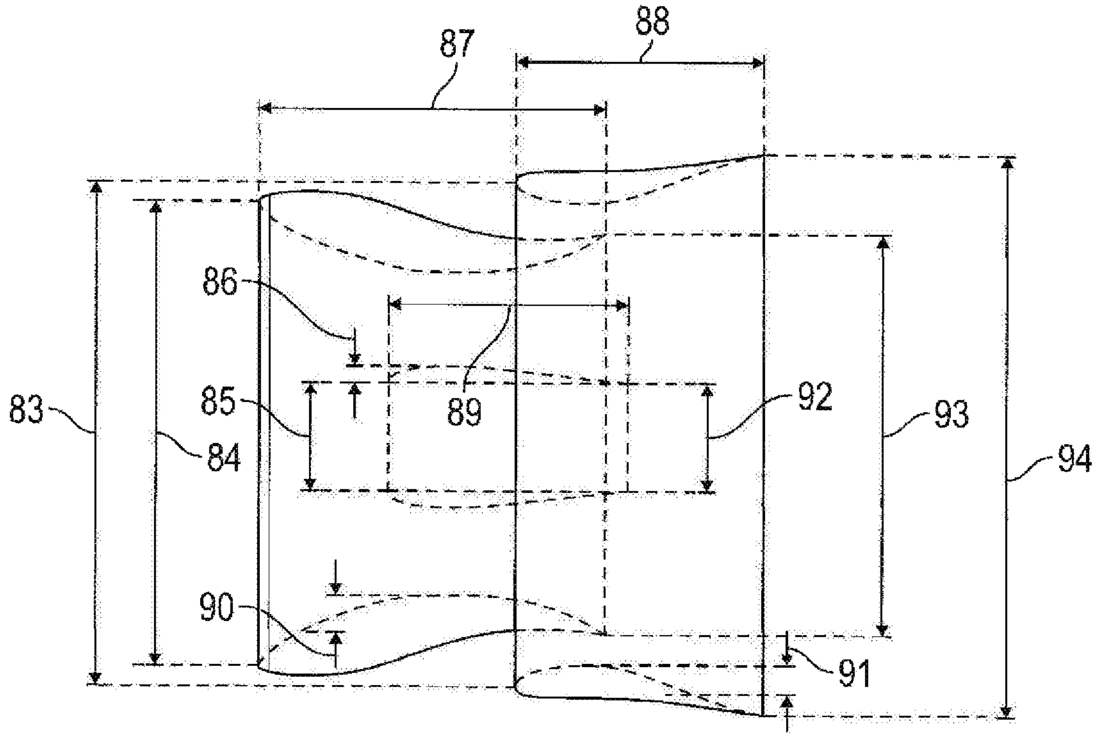
FIG. 34 is a more detailed schematic side view of an accelerator shroud, diffuser and center hub utilizing the rotor blade of FIG. 33.

In FIGS. 33 and 34 some of the important dimensions and relationships are shown in connection with one preferred embodiment of a turbine that can be employed in conjunction with the accelerated and/or redirected flow-inducing, preferably a vorticized/rotational flow-inducing and/or low-pressure field/area inducing arrangements according to the invention.

Legend for FIG. 33

| | | |
|---|---|---|
| 72 | Angle of incidence measured in degrees | Angle between axis of flow direction (95) and axis of profile/cord length |
| 74 | Profile/cord length measured in meters | Distance between leading-edge and trailing edge |
| 75 | Length of rotor blade | Distance between root and tip of blade |
| 76 | Profile/cord thickness measured in meters | Maximum distance between intrados and extrados |
| 78 | Twist of blade measured in degrees | Difference between incidence at root of the blade (72) and incidence at tip of blade (72) |

Legend for FIG. 34

| | |
|---|---|
| 83 | Diameter of diffuser entrance |
| 84 | Diameter of accelerator shroud entrance |
| 85 | Overall diameter of center hub |
| 86 | Profile/cord thickness of center hub |
| 87 | Length of accelerator shroud |
| 88 | Length of diffuser |
| 89 | Length of center hub |

-continued

| | |
|---|---|
| 90 | Profile/cord thickness of accelerator shroud |
| 91 | Profile/cord thickness of diffuser |
| 92 | Diameter of center hub exit |
| 93 | Diameter of accelerator shroud exit |
| 94 | Diameter of diffuser exit |

CFD analysis has shown for tested embodiments that, when both an accelerated and/or redirected flow, preferably a vorticized or rotating flow arrangement is used on the inlet side and a low-pressure field/area inducing arrangement is used on the output side, the flow acceleration through a turbine-like device (such as those described in patent application WO 2016/130984 A2) is typically increased by approximately 30%, but may be increased by an amount as low as 5% or as high as 50%, depending on the flow conditions and turbine type. In FIG. 14 it can be seen that the flow acceleration through the rotor section is increased to almost 5 m/s, and in the center of the low-pressure field/area inducing device it is increased to over 4 m/s. The pressure differentials, if measured forward of the intake and downstream of the outlet, have been shown to be approximately 0.035 bar, but can be as high as 0.2 bar. This pressure differential between intake and outlet contributes substantially to the flow acceleration of the fluid. FIG. 15. shows that the pressure differential between the ambient pressure and the center of the rotor section can be as high as 0.2 bar. FIG. 16 illustrates the directional change of the water flow inside the accelerated and/or redirected flow inducing arrangement and behind the low-pressure field/area inducing arrangement. In the test cases, the arrangements described in the application clearly enhance the performance of turbine-like devices.

A further CFD simulation involves two types of vorticized flow inducing wildlife and debris excluder, i.e., in one simulation a right-hand spin was produced, and in the other simulation a left-hand spin is generated in the incoming fluid. In both simulations, the rotor is turning in the counterclockwise direction. Thus, with the left hand spin the water hits the rotor blade surface at a steeper/greater angle; whereas with the right hand spin the water hits the blade surface at a shallower/lesser angle. In both simulations the same flow velocity of 1.5 m/s and the same rotor RPM of −480 RPM (counterclockwise from the front).

Method of Evaluation these are the parameters used to evaluate the difference in performance, i.e., increase or decrease of flow acceleration and pressure differentials between intake and outlet of:

measurement of flow speed through center hub measurement of flow speed through the rotor section between center hub and blade tip measurement of flow speed on rotor blade surface measurement of pressure before the intake of the turbine measurement of pressure behind the outlet of turbine pressure differential between intake and outlet of the turbine final comparison against turbine with and without wildlife and debris excluder The numbers obtained from these different measurements are compared to one another and converted into a percentage number of the flow acceleration.

CONCLUSIONS FROM EXPERIMENT

1. The pressure differential between intake and outlet is greater with the turbine having a WDE with the right-hand spin than it is for the one with the left-hand spin, but the flow acceleration is generally higher with the WDE inducing a left-hand spin.
2. The flow acceleration in comparison to the ambient flow speed through the center hub is the same for both turbines despite the opposite directions of spin. Comparison to the ambient flow speed is increased to 127%
3. The flow acceleration in comparison to the ambient flow speed through the rotor section, between the center hub and the blade tips, is greater for the left-hand-spin WDE then it is for the right-hand-spin WDE. The flow acceleration is increased to 253% on the left-hand-spin WDE, whereas the right-hand spin is increased to 247%.
4. The flow acceleration in comparison to the ambient flow speed on the rotor blade surface is greater with the left-hand-spin WDE than it is with the right-hand-spin WDE. The left-hand-spin flow acceleration is increased to 447%, whereas the right-hand-spin is increased to 420%.
5. This paragraph is a comparison of the exact same hydrokinetic turbine, one with a vorticized flow inducing wildlife and debris excluder and one without wildlife and debris excluder, i.e., just the bare turbine. Here only flow velocity over the rotor blade surface is compared for both arrangements. Maximum increase in flow acceleration on the rotor blade surface of the turbine with a left-hand-spin WDE is 122% over a turbine without a WDE, and with the right-hand-spin WDE only 115% over the bare turbine. Nonetheless, in both cases, left-hand- or right-hand-spin WDE, the output is greater with the device in place than a turbine that does not have a WDE. Previous studies have shown that a wildlife and debris excluder typically diminishes the flow acceleration by 2% to 3%.

The data show that it is advantageous to have an accelerated and/or redirected flow-inducing, preferably a vorticized/rotational flow-inducing arrangement, as described above according to the invention, in front of the turbine to increase the flow-through velocity and therefore energy output. The net increase provided by the new vorticized flow inducing arrangement does not merely reduce the original negative effect of using a WDE, but rather the negative effect is eliminated and the new WDE arrangement increases the flow speed, thereby providing a total benefit of up to 25% additional flow acceleration.

The invention claimed is:

1. A combination comprising a turbine device in combination with an accelerated and/or redirected flow-inducing arrangement, the turbine device having a fluid inlet end and a fluid outlet end for fluid flowing therethrough, defining a direction of fluid flow through the device, an accelerator shroud section that has a longitudinal central axis and defines within its cross-section a fluid flow area and includes a rotor assembly that is mounted within the accelerator shroud for rotation around the longitudinal central axis, and includes a plurality of rotor blades extending radially outwardly within the accelerator shroud;

the flow-inducing arrangement comprising (1) a forward deflector positioned in front of the fluid inlet end of the turbine device and (2) a rear deflector positioned downstream of the rotor assembly, the forward deflector being configured so as to produce at least one of the following effects on the fluid flowing through the turbine-device: (a) imparting a re-direction of the fluid as it passes through the forward deflector; and/or (b) accelerating the flow velocity of the fluid as it flows through the forward deflector, wherein the forward deflector comprises a forward array of deflector rods that are configured to provide at least one of said effects (a) and/or (b), and wherein the rear deflector comprises a rear array of deflector rods having a hydrofoil/airfoil cross-section that is configured to produce a decrease in pressure in the fluid downstream of the rear deflector, and wherein the rear array of deflector rods of the rear deflector comprises a pattern of concentric rings.

2. The combination as claimed in claim 1, wherein the rear array of the rear deflector rods are configured to produce a radial redirection of the fluid with respect to the direction of fluid flow through the turbine device.

3. The combination as claimed in claim 1, wherein the forward array of the forward deflector comprises a conically-shaped array of deflector rods that includes a plurality of deflector rod sub-arrays oriented with respect to one another so as to produce a re-direction of the fluid that comprises at least some rotational re-direction.

4. The combination as claimed in claim 3, wherein the forward deflector comprises a wildlife and/or debris deflector, and wherein the spacing of the deflector rods in the sub-arrays of the forward deflector that form the conically shaped forward deflector run parallel to one another in each respective sub-array, and have a spacing in each sub-array that is equal, thereby defining the minimum size of object that can pass through the wildlife and/or debris deflector.

5. The combination as claimed in claim 1, wherein the turbine device comprises a hydrokinetic turbine device.

6. The combination as claimed in claim 1, wherein the forward deflector is configured to produce a re-directed fluid flow that includes at least some rotational re-direction of the fluid flowing through it.

7. The combination as claimed in claim 1, deflector rods of the forward deflector have a cross-sectional shape that produces an acceleration of the fluid flow through them.

8. The combination as claimed in claim 7, wherein said cross-sectional shape of said deflector rods of the forward deflector array comprise a hydrofoil/airfoil cross-sectional shape.

9. The combination as claimed in claim 7, wherein the deflector rod array of both the forward deflector array and the rear deflector array include deflector rods having a cross-sectional shape that produces an acceleration of the fluid flow through them.

10. The combination as claimed in claim 1, wherein the rotor assembly (a) is mounted for support and rotation on the inner surface of the accelerator shroud, and (b) includes a center hub, and wherein the plurality of rotor blades are mounted on the center hub at their radially inner ends, and the center hub has an open center defined by a wall member that has a hydrofoil-shaped cross-section.

11. The combination as claimed in claim 1, wherein, said rotor blades are configured to rotate the rotor assembly in a first direction of rotation in response to fluid flowing in the direction of fluid flow through the turbine device, and wherein the forward deflector is configured to produce a re-directed fluid flow that includes at least some rotational re-direction of the fluid in a second direction of rotation that is opposite to said first direction of rotation of the rotor assembly.

12. The combination as claimed in claim 11, wherein said rotor assembly further comprises an outer rotor ring to which the rotor blades are also attached at their radially outer ends, wherein at least some of the rotor blades have an asymmetrical hydrofoil cross-sectional shape, and wherein at least some of the rotor blades have a blade thickness that is greater at their radially outer ends than at their radially inner ends.

13. A method for enhancing the performance of a turbine device having a fluid inlet end and a fluid exit end defining a direction of fluid flow through the turbine device, the turbine device including (1) an accelerator shroud section that has a longitudinal central axis and defines within its cross-section a fluid flow area and includes a rotor assembly that is (a) mounted within the accelerator shroud for rotation around the longitudinal central axis, and (b) includes a plurality of rotor blades extending radially outwardly within the accelerator shroud, said rotor blades being configured to rotate the rotor assembly in a first direction of rotation in response to fluid flowing in the direction of fluid flow through the turbine device, and (2) a forward deflector placed upstream at the fluid inlet end of the turbine device, comprising:

causing a fluid to flow through the forward deflector which is configured to produce a re-directed fluid flow that includes rotational re-direction of substantially all of the fluid flow in a second direction of rotation that is opposite to said first direction of rotation of the rotor assembly; and then causing the re-directed fluid that has flowed through the forward deflector and has been rotationally re-directed in the second direction of rotation to flow into the fluid inlet end of the turbine device.

14. The method as claimed in claim 13, wherein the forward deflector comprises at least one array of spaced rods that are oriented in such a way as to produce said rotational re-direction of the fluid.

15. The method as claimed in claim 14, wherein the forward deflector comprises a conically-shaped structure, wherein the conically-shaped structure comprises a plurality of sub-arrays of spaced rods oriented to produce the rotational re-direction of the fluid.

16. The method as claimed in claim 15, wherein at least some of the rods in the sub-arrays of deflector rods of the forward deflector structure are configured with a cross-sectional shape that produces an acceleration of fluid flow through the turbine device.

17. The method as claimed in claim 16, wherein the cross-sectional shape of said at least some of the rods comprises an asymmetrical profile.

18. The method as claimed in claim 15, wherein the deflector rods in the plural sub-arrays of the conically-shaped structure have a spacing that is equal, thereby defining the minimum sized of object that can pass through the forward deflector.

19. The method as claimed in claim 13, wherein the turbine device further includes a rear deflector that is positioned downstream of the rotor assembly, and wherein the method further comprises causing the fluid exiting the rotor assembly to flow through the rear deflector which is configured to induce a reduced-pressure field or area downstream of the rear deflector, by creating at least one of an accelerated and/or re-directed flow through the rear deflector.

20. The method as claimed in claim 19, wherein the rear deflector comprises a plurality of rear deflector rods having a pattern of concentric rings, wherein at least some of the rear deflector rods have a cross-sectional shape comprising an asymmetrical hydrofoil.

21. The method as claimed in claim 19, wherein the forward diverter comprises a wildlife and/or debris diverter.

22. The method as claimed in claim 13, wherein the turbine device comprises a hydrokinetic turbine and the fluid comprises water.

23. The method as claimed in claim 22, wherein the accelerator shroud section of the hydrokinetic turbine comprises a cylindrical cross-section that contains therein an integral hydrokinetic force-generating member comprising said rotor assembly that (a) is mounted for support and rotation on the inner surface of the accelerator shroud, and (b) includes a center hub, and wherein (c) the plurality of rotor blades are mounted on the center hub at their radially inner ends, and the center hub has an open center defined by a wall member that has a hydrofoil-shaped cross-section.

24. The method as claimed in claim 23, wherein said rotor assembly further comprises an outer rotor ring to which the rotor blades are also attached at their radially outer end, wherein at least some of the rotor blades have an asymmetrical hydrofoil cross-sectional shape, and wherein at least some of the rotor blades have a blade thickness that is greater at their radially outer ends than at their radially inner ends.

25. A combination comprising a turbine device in combination with an accelerated and/or redirected flow-enhancing arrangement, the turbine device having a fluid inlet end and a fluid outlet end for fluid flowing therethrough, defining a direction of fluid flow through the device, an accelerator shroud section that has a longitudinal central axis and defines within its cross-section a fluid flow area and includes a rotor assembly that is mounted within the accelerator shroud for rotation around the longitudinal central axis, and includes a plurality of rotor blades extending radially outwardly within the accelerator shroud, said rotor blades being configured to rotate the rotor assembly in a first direction of rotation in response to fluid flowing in the direction of fluid flow through the turbine device; and the flow-inducing arrangement comprising a forward deflector positioned upstream of the fluid inlet end of the turbine device, the forward deflector being configured so as to produce the effect, on the fluid flowing through it, of imparting a re-direction of the fluid as it passes through the forward deflector, wherein the forward deflector comprises an array of deflector rods having a hydrofoil/airfoil cross-section that are configured to provide said re-direction imparting effect in such a manner as to produce a re-directed fluid flow that includes rotational re-direction of substantially all of the fluid in a second direction of rotation that is opposite to said first direction of rotation of the rotor assembly.

26. The combination as claimed in claim 25, wherein the forward deflector comprises a conically-shaped array of deflector rods that includes a plurality of deflector rod sub-arrays.

27. The combination as claimed in claim 25, wherein the turbine device comprises a hydrokinetic turbine, wherein the accelerator shroud comprises a cylindrical cross-section that contains therein an integral hydrokinetic force-generating member comprising said rotor assembly that (a) is mounted for support and rotation on the inner surface of the accelerator shroud, and (b) includes a center hub, and wherein (c) the plurality of rotor blades are mounted on the center hub at their radially inner ends, and the center hub has an open center defined by a wall member that has a hydrofoil-shaped cross-section.

28. The combination as claimed in claim 27, wherein said rotor assembly further comprises an outer rotor ring to which the rotor blades are also attached at their radially outer ends, wherein at least some of the rotor blades have an asymmetrical hydrofoil cross-sectional shape, and wherein at least some of the rotor blades have a blade thickness that is greater at their radially outer ends than at theft radially inner ends.

29. The combination as claimed in claim 25, wherein the turbine device further includes a rear deflector that is positioned downstream of the rotor assembly, and wherein the rear deflector is configured to induce a reduced-pressure field or area downstream of the rear deflector, by creating at least one of an accelerated and/or re-directed flow through the rear deflector.

30. The combination as claimed in claim 29, wherein the rear deflector comprises an array of deflector rods that are configured to produce a decrease in pressure at the outlet end of the turbine device, by producing a radial redirection of the fluid with respect to the direction of fluid flow through the turbine device, wherein the rear deflector array of deflector rods includes deflector rods having a cross-sectional shape that produces an acceleration of the fluid flowing through the rear deflector, and wherein the array of deflector rods of the rear deflector forms a pattern of concentric rings.

* * * * *